US011667300B2

(12) United States Patent
Ota et al.

(10) Patent No.: US 11,667,300 B2
(45) Date of Patent: Jun. 6, 2023

(54) VEHICLE CONTROL APPARATUS

(71) Applicant: Toyota Jidosha Kabushiki Kaisha, Toyota Aichi-ken (JP)

(72) Inventors: Junya Ota, Susono (JP); Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 17/182,703

(22) Filed: Feb. 23, 2021

(65) Prior Publication Data

US 2021/0276573 A1 Sep. 9, 2021

(30) Foreign Application Priority Data

Mar. 9, 2020 (JP) .............................. JP2020-039741

(51) Int. Cl.
*B60W 40/114* (2012.01)
*B60W 30/02* (2012.01)
*B60W 10/18* (2012.01)
*B60W 10/119* (2012.01)
*B60T 8/1755* (2006.01)
*B60W 40/13* (2012.01)

(52) U.S. Cl.
CPC ......... *B60W 40/114* (2013.01); *B60W 10/119* (2013.01); *B60W 10/18* (2013.01); *B60W 30/02* (2013.01); *B60T 8/1755* (2013.01); *B60W 2040/1346* (2013.01); *B60W 2520/105* (2013.01)

(58) Field of Classification Search
CPC .. B60W 40/114; B60W 10/119; B60W 10/18; B60W 30/02; B60W 2040/1346; B60W 2520/105; B60T 8/1755
See application file for complete search history.

(56) References Cited

U.S. PATENT DOCUMENTS 6,219,610 B1 * 4/2001 Araki .................... B60T 8/1755
701/72
2002/0013646 A1 * 1/2002 Nishizaki ............. B62D 5/0472
180/443

(Continued)

FOREIGN PATENT DOCUMENTS

JP 2016-111878 A 6/2016

*Primary Examiner* — Fadey S. Jabr
*Assistant Examiner* — Naeem Taslim Alam
(74) *Attorney, Agent, or Firm* — Dinsmore & Shohl LLP

(57) ABSTRACT

A vehicle control apparatus executes a yaw moment control to control a yaw rate of a vehicle to a target yaw rate by adjusting braking or driving forces applied to wheels of the vehicle and a speed difference control to control front and rear wheel speed differences within predetermined ranges by adjusting the braking or driving forces. The vehicle control apparatus executes the yaw moment control to the front wheels when the front wheel speed difference is within the predetermined range and executes the speed difference control to the front wheels when the front wheel speed difference is not within the predetermined range. The vehicle control apparatus executes the yaw moment control to the rear wheels when the rear wheel speed difference is within the predetermined range and executes the speed difference control to the rear wheels when the rear wheel speed difference is not within the predetermined range.

7 Claims, 7 Drawing Sheets

(56) References Cited

U.S. PATENT DOCUMENTS

| | | | |
|---|---|---|---|
| 2006/0196712 A1* | 9/2006 | Toyota | B60L 3/108 |
| | | | 180/165 |
| 2007/0162203 A1* | 7/2007 | Yasutake | B60W 30/04 |
| | | | 701/1 |
| 2008/0140264 A1* | 6/2008 | O'Dea | B60T 8/1755 |
| | | | 701/1 |
| 2012/0150376 A1* | 6/2012 | Ash | B60L 15/20 |
| | | | 701/22 |
| 2012/0215406 A1* | 8/2012 | Tanimoto | B62D 15/025 |
| | | | 701/41 |
| 2013/0245910 A1* | 9/2013 | Watanabe | B60T 8/4872 |
| | | | 701/79 |
| 2017/0174210 A1* | 6/2017 | Choi | B60W 30/08 |
| 2020/0384979 A1* | 12/2020 | Hiraga | B60T 8/17554 |
| 2022/0258603 A1* | 8/2022 | Hiroi | B60K 5/04 |

* cited by examiner

VEHICLE CONTROL APPARATUS

CROSS-REFERENCE TO RELATED APPLICATIONS

This application claims priority to Japanese patent application No. JP 2020-039741 filed on Mar. 9, 2020, the content of which is hereby incorporated by reference in its entirety.

BACKGROUND

Field

The disclosure relates to a vehicle control apparatus.

Description of the Related Art

There is known a vehicle control apparatus which executes a yaw moment control and a traction control (for example, see JP 2016-111878 A). The yaw moment control is a control to control braking forces or driving forces applied to road wheels of a vehicle to control a yaw rate of the vehicle to a predetermined yaw rate, thereby improving a line traceability of the turning vehicle. The traction control is a control to control the driving forces applied to the road wheels of the vehicle to control slip ratios of the road wheels to a road surface within a predetermined range when the slip ratios increase.

When the slip ratio of any one of the road wheels exceeds a predetermined threshold while the known vehicle control apparatus executes the yaw moment control, the known vehicle control apparatus stops executing the yaw moment control and starts to execute the traction control. As described above, the traction control controls the driving forces applied to the road wheels individually. In particular, the traction control controls the driving forces applied to the road wheels individually to control the slip ratios of the road wheels to or below the predetermined threshold without considering a relationship between the road wheels such as a relationship in magnitude between the driving forces applied to the road wheels. Therefore, while the known vehicle control apparatus executes the traction control, the known vehicle control apparatus does not execute any processes to generate the yaw moment on the vehicle to control the yaw rate of the vehicle to the predetermined yaw rate. As a result, the proper line traceability of the vehicle cannot be achieved when the traction control is executed while the vehicle turns.

SUMMARY

The present disclosure has been made for solving problems described above. An object of the present disclosure is to provide a vehicle control apparatus which can ensure the proper line traceability of the vehicle when the vehicle control apparatus executes a control to control the slip ratios of the road wheels within a predetermined range while the vehicle control apparatus executes the yaw moment control.

A vehicle control apparatus according to the present disclosure is applied to a vehicle including a front left wheel, a front right wheel, a rear left wheel, and a rear right wheel. The vehicle control apparatus according to the present disclosure comprises an electronic control unit.

The electronic control unit is configured to execute a yaw moment control to control a yaw rate of the vehicle to a target yaw rate by (i) adjusting a braking force or a driving force applied to the front left wheel by a front left wheel yaw moment adjustment value, (ii) adjusting the braking force or the driving force applied to the front right wheel by a front right wheel yaw moment adjustment value, (iii) adjusting the braking force or the driving force applied to the rear left wheel by a rear left wheel yaw moment adjustment value, and (iv) adjusting the braking force or the driving force applied to the rear right wheel by a rear right wheel yaw moment adjustment value. The electronic control unit is further configured to execute a speed difference control to (i) control a front wheel speed difference between a speed of the front left wheel and a speed of the front right wheel within a predetermined front wheel speed difference range by adjusting the braking force or the driving force applied to the front left wheel by a front wheel speed difference adjustment value and adjusting the braking force or the driving force applied to the front right wheel by the front wheel speed difference adjustment value and (ii) control a rear wheel speed difference between a speed of the rear left wheel and a speed of the rear right wheel within a predetermined rear wheel speed difference range by adjusting the braking force or the driving force applied to the rear left wheel by a rear wheel speed difference adjustment value and adjusting the braking force or the driving force applied to the rear right wheel by the rear wheel speed difference adjustment value.

The electronic control unit is configured to execute the yaw moment control to the front left and right wheels when the front wheel speed difference is within the predetermined front wheel speed difference range. On the other hand, the electronic control unit is configured to execute the speed difference control to the front left and right wheels when the front wheel speed difference is not within the predetermined front wheel speed difference range.

The electronic control unit is further configured to execute the yaw moment control to the rear left and right wheels when the rear wheel speed difference is within the predetermined rear wheel speed difference range. On the other hand, the electronic control unit is configured to execute the speed difference control to the rear left and right wheels when the rear wheel speed difference is not within the predetermined rear wheel speed difference range.

When the slip ratios of the road wheels of the vehicle are within a proper slip ratio range, the proper line traceability of the vehicle while the vehicle turns can be ensured. The electronic control unit of the vehicle control apparatus according to the present disclosure executes the speed difference control to control the front wheel speed difference within the predetermined front wheel speed difference range when the front wheel speed difference becomes out of the predetermined front wheel speed difference range. When the front wheel speed difference is controlled within the predetermined front wheel speed difference range, the slip ratios of the front left and right wheels are controlled within the proper slip ratio range. Similarly, the electronic control unit of the vehicle control apparatus according to the present disclosure executes the speed difference control to control the rear wheel speed difference within the predetermined rear wheel speed difference range when the rear wheel speed difference becomes out of the predetermined rear wheel speed difference range. When the rear wheel speed difference is controlled within the predetermined rear wheel speed difference range, the slip ratios of the rear left and right wheels are controlled within the proper slip ratio range. Thus, with the vehicle control apparatus according to the present disclosure, the proper line traceability of the vehicle can be ensured even when the difference speed control is executed to control the slip ratios of the road wheels of the vehicle within the proper slip ratio range while the yaw moment control is executed.

According to a teaching of the present disclosure, when (i) the electronic control unit executes the yaw moment control to the front left and right wheels, (ii) the front wheel speed difference is larger than a lower limit of the predetermined front wheel speed difference range, and (iii) a difference between the front wheel speed difference and an upper limit of the predetermined front wheel speed difference range is smaller than or equal to a value within a predetermined front wheel upper range, the electronic control unit may be configured to acquire (i) a first front wheel upper adjustment ratio which decreases as the front wheel speed difference increases and (ii) a second front wheel upper adjustment ratio which increases as the front wheel speed difference increases. Then, the electronic control unit may be configured to (i) adjust the braking force or the driving force applied to the front left wheel by the first front wheel upper adjustment ratio of the front left wheel yaw moment adjustment value and the second front wheel upper adjustment ratio of the front wheel speed difference adjustment value and (ii) adjust the braking force or the driving force applied to the front right wheel by the first front wheel upper adjustment ratio of the front right wheel yaw moment adjustment value and the second front wheel upper adjustment ratio of the front wheel speed difference adjustment value.

Moreover, when (i) the electronic control unit executes the yaw moment control to the rear left and right wheels, (ii) the rear wheel speed difference is larger than a lower limit of the predetermined rear wheel speed difference range, and (iii) a difference between the rear wheel speed difference and an upper limit of the predetermined rear wheel speed difference range is smaller than or equal to a value within a predetermined rear wheel upper range, the electronic control unit may be configured to acquire (i) a first rear wheel upper adjustment ratio which decreases as the rear wheel speed difference increases and (ii) a second rear wheel upper adjustment ratio which increases as the rear wheel speed difference increases. Then, the electronic control unit may be configured to (i) adjust the braking force or the driving force applied to the rear left wheel by the first rear wheel upper adjustment ratio of the rear left wheel yaw moment adjustment value and the second rear wheel upper adjustment ratio of the rear wheel speed difference adjustment value and (ii) adjust the braking force or the driving force applied to the rear right wheel by the first rear wheel upper adjustment ratio of the rear right wheel yaw moment adjustment value and the second rear wheel upper adjustment ratio of the rear wheel speed difference adjustment value.

With this teaching of the present disclosure, the adjustment value for adjusting the braking force and the driving force is not directly switched from the yaw moment adjustment value to the speed difference adjustment value. Similarly, the adjustment value for adjusting the braking force and the driving force is not directly switched from the speed difference adjustment value to the yaw moment adjustment value. Thereby, the braking forces and the driving forces applied to the road wheels of the vehicle can be prevented from rapidly changing. Thus, a proper stability of the vehicle can be ensured.

According to another teaching of the present disclosure, when (i) the electronic control unit executes the yaw moment control to the front left and right wheels, (ii) the front wheel speed difference is smaller than an upper limit of the predetermined front wheel speed difference range, and (iii) a difference between the front wheel speed difference and a lower limit of the predetermined front wheel speed difference range is smaller than or equal to a value within a predetermined front wheel lower range, the electronic control unit may be configured to acquire (i) a first front wheel lower adjustment ratio which decreases as the front wheel speed difference decreases and (ii) a second front wheel lower adjustment ratio which increases as the front wheel speed difference decreases. Then, the electronic control unit may be configured to (i) adjust the braking force or the driving force applied to the front left wheel by the first front wheel lower adjustment ratio of the front left wheel yaw moment adjustment value and the second front wheel lower adjustment ratio of the front wheel speed difference adjustment value and (ii) adjust the braking force or the driving force applied to the front right wheel by the first front wheel lower adjustment ratio of the front right wheel yaw moment adjustment value and the second front wheel lower adjustment ratio of the front wheel speed difference adjustment value.

Moreover, when (i) the electronic control unit executes the yaw moment control to the rear left and right wheels, (ii) the rear wheel speed difference is smaller than an upper limit of the predetermined rear wheel speed difference range, and (iii) a difference between the rear wheel speed difference and a lower limit of the predetermined rear wheel speed difference range is smaller than or equal to a value within a predetermined rear wheel lower range, the electronic control unit may be configured to acquire (i) a first rear wheel lower adjustment ratio which decreases as the rear wheel speed difference decreases and (ii) a second rear wheel lower adjustment ratio which increases as the rear wheel speed difference decreases. Then, the electronic control unit may be configured to (i) adjust the braking force or the driving force applied to the rear left wheel by the first rear wheel lower adjustment ratio of the rear left wheel yaw moment adjustment value and the second rear wheel lower adjustment ratio of the rear wheel speed difference adjustment value and (ii) adjust the braking force or the driving force applied to the rear right wheel by the first rear wheel lower adjustment ratio of the rear right wheel yaw moment adjustment value and the second rear wheel lower adjustment ratio of the rear wheel speed difference adjustment value.

With this teaching of the present disclosure, the adjustment value for adjusting the braking force and the driving force is not directly switched from the yaw moment adjustment value to the speed difference adjustment value. Similarly, the adjustment value for adjusting the braking force and the driving force is not directly switched from the speed difference adjustment value to the yaw moment adjustment value. Thereby, the braking forces and the driving forces applied to the road wheels can be prevented from rapidly changing. Thus, the proper stability of the vehicle can be ensured.

According to further another teaching of the present disclosure, the predetermined front wheel speed difference range and the predetermined rear wheel speed difference range set when a moving speed of a body of the vehicle is high, may be larger than the predetermined front wheel speed difference range and the predetermined rear wheel speed difference range set when the moving speed of the body of the vehicle is low, respectively.

The proper slip ratio range varies, depending on the moving speed of the body of the vehicle. With this teaching of the present disclosure, the predetermined front wheel speed difference range and the predetermined rear wheel speed difference range are set in consideration of the moving speed of the body of the vehicle. Thus, proper ranges can be set as the predetermined front wheel speed difference range and the predetermined rear wheel speed difference range, independently of the moving speed of the body of the vehicle.

According to further another teaching of the present disclosure, the predetermined front wheel speed difference range set when a front wheel slip ratio average value of slip ratios of the front left and right wheels is large, may be smaller than the predetermined front wheel speed difference range set when the front wheel slip ratio average value is small. Moreover, the predetermined rear wheel speed difference range set when a rear wheel slip ratio average value of slip ratios of the rear left and right wheels is large, may be smaller than the predetermined rear wheel speed difference range set when the rear wheel slip ratio average value is small.

With this teaching of the present disclosure, the predetermined front wheel speed difference range and the predetermined rear wheel speed difference range are set in consideration of the slip ratios of the road wheels of the vehicle. Therefore, the yaw moment control can be prevented from being executed when the braking forces and the driving forces causing the slip ratios of the road wheels to exceed an acceptable upper limit are applied to the road wheels. Thus, a proper braking performance, a proper acceleration performance, and a proper line traceability of the vehicle can be ensured.

According to further another teaching of the present disclosure, when (i) the electronic control unit executes the yaw moment control, (ii) the electronic control unit applies the braking forces to the front left and right wheels, and (iii) a front wheel slip ratio average value of slip ratios of the front left and right wheels is larger than a predetermined slip ratio, the electronic control unit may be configured to increase and decrease the braking forces applied to the front left and right wheels with adjusting the braking forces applied to the front left and right wheels by the yaw moment adjustment value.

Moreover, when (i) the electronic control unit executes the yaw moment control, (ii) the electronic control unit applies the braking forces to the rear left and right wheels, and (iii) a rear wheel slip ratio average value of slip ratios of the rear left and right wheels is larger than the predetermined slip ratio, the electronic control unit may be configured to increase and decrease the braking forces applied to the rear left and right wheels with adjusting the braking forces applied to the rear left and right wheels by the yaw moment adjustment value.

With this teaching of the present disclosure, the braking forces applied to the front wheels are increased and decreased when the average value of the slip ratios of the front wheels become larger than the predetermined slip ratio while (i) the yaw moment control is executed, and (ii) the braking forces are applied to the front wheels. Similarly, the braking forces applied to the rear wheels are increased and decreased when the average value of the slip ratios of the rear wheels become larger than the predetermined slip ratio while (i) the yaw moment control is executed, and (ii) the braking forces are applied to the rear wheels. Therefore, the slip ratios of the road wheels may be controlled to the proper slip ratios. As a result, the proper braking performance of the vehicle can be achieved. In addition, the braking forces are adjusted by the yaw moment adjustment values while the braking forces are increased and decreased. Thus, the proper braking performance and the proper line traceability of the vehicle can be achieved when the braking forces are increased and decreased.

According to further another teaching of the present disclosure, when (i) the electronic control unit executes the speed difference control, (ii) the electronic control unit applies the braking forces to the front left and right wheels, and (iii) a front wheel slip ratio average value of slip ratios of the front left and right wheels is larger than a predetermined slip ratio, the electronic control unit may be configured to increase and decrease the braking forces applied to the front left and right wheels with adjusting the braking forces applied to the front left and right wheels by the speed difference adjustment value.

Moreover, when (i) the electronic control unit executes the speed difference control, (ii) the electronic control unit applies the braking forces to the rear left and right wheels, and (iii) a rear wheel slip ratio average value of slip ratios of the rear left and right wheels is larger than a predetermined slip ratio, the electronic control unit may be configured to increase and decrease the braking forces applied to the rear left and right wheels with adjusting the braking forces applied to the rear left and right wheels by the speed difference adjustment value.

With this teaching of the present disclosure, the braking forces applied to the front wheels are increased and decreased when the average value of the slip ratios of the front wheels becomes larger than the predetermined slip ratio while (i) the speed difference control is executed, and (ii) the braking forces are applied to the front wheels. Similarly, the braking forces applied to the rear wheels are increased and decreased when the average value of the slip ratios of the rear wheels becomes larger than the predetermined slip ratio while (i) the speed difference control is executed, and (ii) the braking forces are applied to the rear wheels. Therefore, the slip ratios of the road wheels may be controlled to the proper slip ratios. As a result, the proper braking performance of the vehicle can be achieved. In addition, the braking forces are adjusted by the speed difference adjustment values while the braking forces are increased and decreased. Thus, the proper braking performance and the proper line traceability of the vehicle can be achieved when the braking forces are increased and decreased.

Elements of the present disclosure are not limited to elements of embodiments and modified examples of the present disclosure described along with the drawings. The other objects, features and accompanied advantages of the present disclosure can be easily understood from the embodiments and the modified examples of the present disclosure.

DESCRIPTION OF THE EMBODIMENTS

Figure 1:
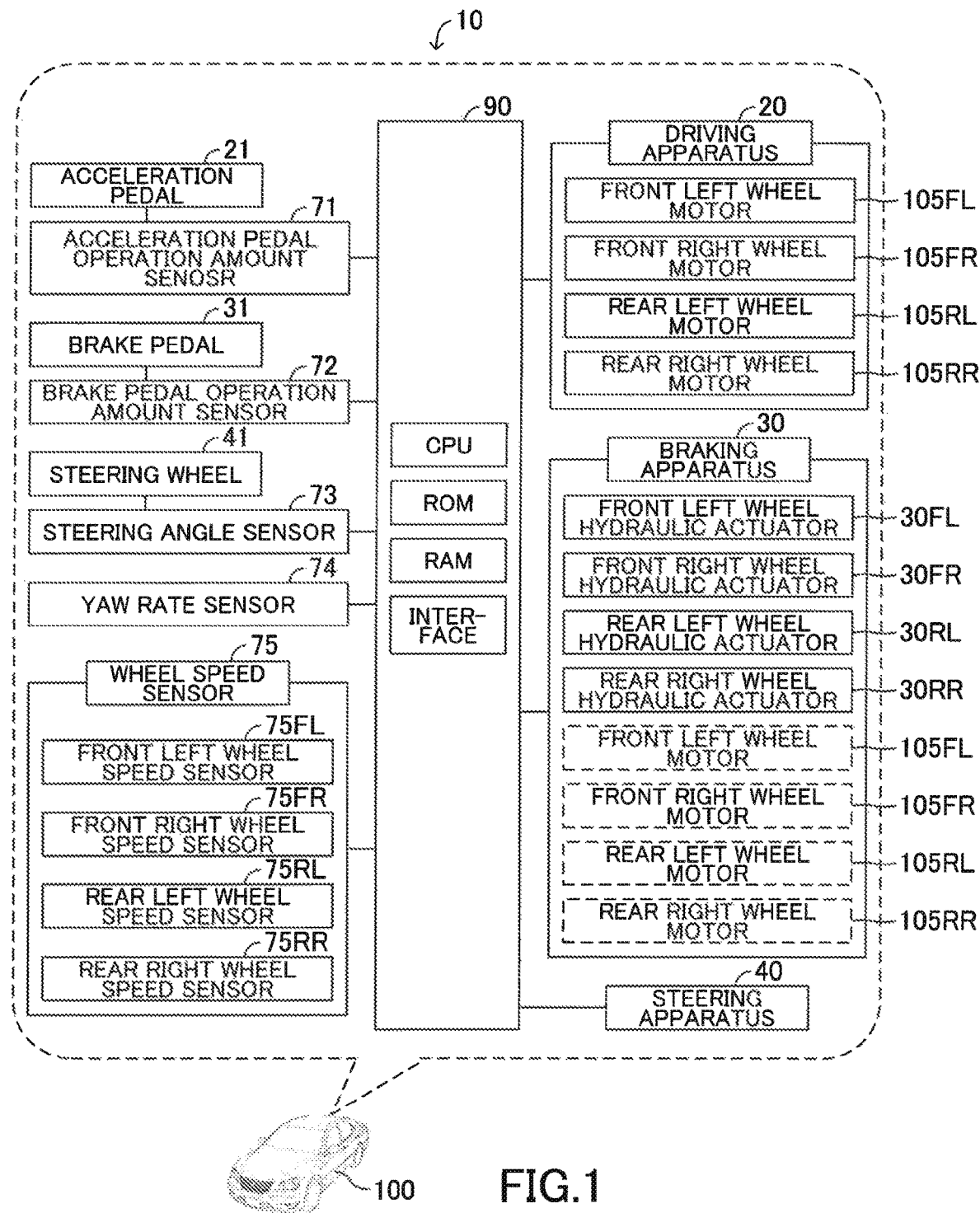
FIG. 1 is a view showing a vehicle control apparatus according to an embodiment of the present disclosure and a vehicle to which the vehicle control apparatus is applied.

Below, a vehicle control apparatus according to an embodiment of the present disclosure will be described with reference to the drawings. As shown in FIG. 1, the vehicle control apparatus 10 according to the embodiment of the present disclosure is installed on a vehicle 100.

Figure 2:
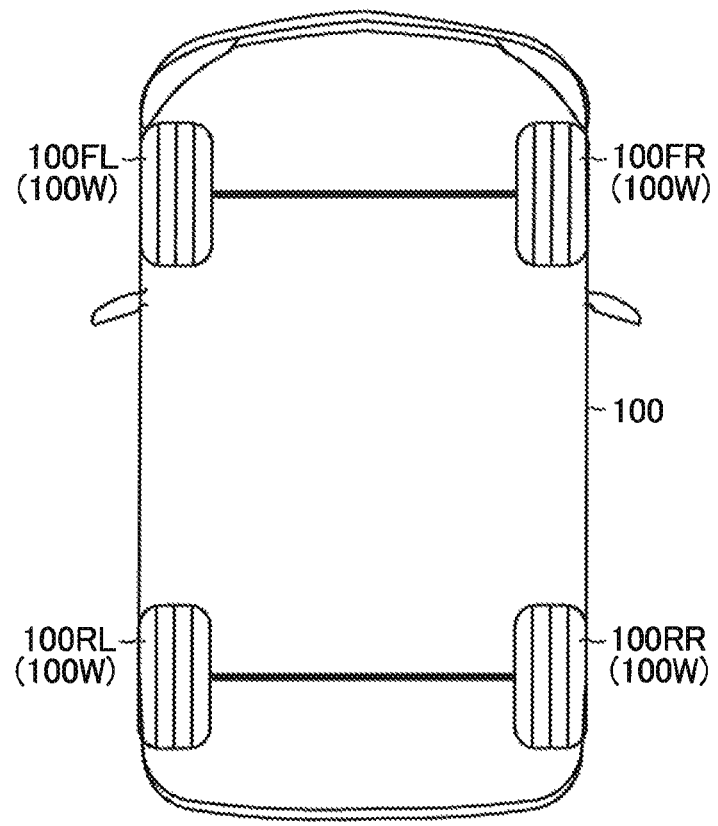
FIG. 2 is a view showing the vehicle to which the vehicle control apparatus according to the embodiment of the present disclosure is applied.

As shown in FIG. 2, the vehicle 100 includes four road wheels 100W, i.e., a front left wheel 100FL, a front right wheel 100FR, a rear left wheel 100RL, and a rear right wheel 100RR. In this embodiment, steered wheels of the vehicle 100 are the front left wheel 100FL and the front right wheel 100FR. Also, driven wheels of the vehicle 100 are the front left wheel 100FL, the front right wheel 100FR, the rear left wheel 100RL, and the rear right wheel 100RR.

As shown in FIG. 1, the vehicle 100 is installed with a driving apparatus 20, a braking apparatus 30, and a steering apparatus 40.

The driving apparatus 20 generates driving torques to be applied to the road wheels 100W to drive the vehicle 100. In this embodiment, the driving apparatus 20 includes a front left wheel electric motor 105FL, a front right wheel electric motor 105FR, a rear left wheel electric motor 105RL, and a rear right wheel electric motor 105RR.

The front left wheel electric motor 105FL can apply the driving torque to the front left wheel 100FL. The front right wheel electric motor 105FR can apply the driving torque to the front right wheel 100FR. The rear left wheel electric motor 105RL can apply the driving torque to the rear left wheel 100RL. The rear right wheel electric motor 105RR can apply the driving torque to the rear right wheel 100RR.

It should be noted that the driving apparatus 20 may be any apparatuses which can individually apply the driving torques to the road wheels 100W. For example, if the vehicle 100 includes differential gears which can distribute the driving torque to the driving torques to be applied to the front left wheel 100FL, the front right wheel 100FR, the rear left wheel 100RL, and the rear right wheel 100RR with adjusting magnitudes of the distributed driving torques, the driving apparatus 20 may include an internal combustion engine and be configured to apply the driving torque generated by the internal combustion engine to the road wheels 100W. Alternatively, the driving apparatus 20 may include the internal combustion engine and one or more electric motors and be configured to apply the driving torque generated by the internal combustion engine and the one or more electric motors to the road wheels 100W.

In this description, driving forces are forces applied to the road wheels 100W by applying the driving torques to the road wheels 100W Hereinafter, the driving forces applied to the front left wheel 100FL, the front right wheel 100FR, the rear left wheel 100RL, and the rear right wheel 100RR, will be referred to as "the front left wheel driving force A_FL, the front right wheel driving force A_FR, the rear left wheel driving force A_RL, and the rear right wheel driving force A_RR", respectively.

The braking apparatus 30 generates braking torques to be applied to the road wheels 100W to brake the vehicle 100. In this embodiment, the braking apparatus 30 includes a front left wheel hydraulic actuator 30FL, a front right wheel hydraulic actuator 30FR, a rear left wheel hydraulic actuator 30RL, and a rear right wheel hydraulic actuator 30RR.

The front left wheel hydraulic actuator 30FL can apply the braking torque to the front left wheel 100FL. The front right wheel hydraulic actuator 30FR can apply the braking torque to the front right wheel 100FR. The rear left wheel hydraulic actuator 30RL can apply the braking torque to the rear left wheel 100RL. The rear right wheel hydraulic actuator 30RR can apply the braking torque to the rear right wheel 100RR.

Also, the front left wheel electric motor 105FL, the front right wheel electric motor 105FR, the rear left wheel electric motor 105RL, and the rear right wheel electric motor 105RR of the driving apparatus 20 can apply the braking torques to the front left wheel 100FL, the front right wheel 100FR, the rear left wheel 100RL, and the rear right wheel 100RR, respectively. Therefore, in this embodiment, the front left wheel electric motor 105FL, the front right wheel electric motor 105FR, the rear left wheel electric motor 105RL, and the rear right wheel electric motor 105RR are also components of the braking apparatus 30.

It should be noted that the braking apparatus 30 may be any apparatuses which can apply the braking torques individually to the road wheels 100W.

In this description, braking forces are forces applied to the road wheel 100W by applying the braking torques to the road wheels 100W. Hereinafter, the braking forces applied to the front left wheel 100FL, the front right wheel 100FR, the rear left wheel 100RL, and the rear right wheel 100RR, will be referred to as "the front left wheel braking force B_FL, the front right wheel braking force B_FR, the rear left wheel braking force B_RL, and the rear right wheel braking force B_RR", respectively.

The steering apparatus 40 generates a steering torque to be applied to the steered wheels of the vehicle 100 to steer the vehicle 100. In this embodiment, as described above, the steered wheels are the front left wheel 100FL and the front right wheel 100FR.

The vehicle control apparatus 10 includes an ECU 90. The ECU 90 includes a CPU, a ROM, a RAM, and an interface. The driving apparatus 20, the braking apparatus 30, and the steering apparatus 40 are electrically connected to the ECU 90.

The ECU 90 can control the driving torques and the braking torques generated by the driving apparatus 20 by controlling actuations of the driving apparatus 20, in particular, actuations of the front left wheel electric motor 105FL, the front right wheel electric motor 105FR, the rear left wheel electric motor 105RL, and the rear right wheel electric motor 105RR of the driving apparatus 20.

The ECU 90 can control the braking torques generated by the braking apparatus 30 by controlling actuations of the braking apparatus 30, in particular, actuations of the front left wheel hydraulic actuator 30FL, the front right wheel hydraulic actuator 30FR, the rear left wheel hydraulic actuator 30RL, and the rear right wheel hydraulic actuator 30RR of the braking apparatus 30.

The ECU 90 can control the steering torque generated by the steering apparatus 40 by controlling activations of the steering apparatus 40.

Further, the vehicle 100 is installed with an acceleration pedal operation amount sensor 71, a brake pedal operation amount sensor 72, a steering angle sensor 73, a yaw rate sensor 74, and a wheel speed sensor 75. The acceleration pedal operation amount sensor 71, the brake pedal operation amount sensor 72, the steering angle sensor 73, the yaw rate sensor 74, and the wheel speed sensor 75 are electrically connected to the ECU 90.

The acceleration pedal operation amount sensor 71 detects an amount of an operation applied to an acceleration pedal 21 of the vehicle 100 and sends a signal representing the detected amount to the ECU 90. The ECU 90 obtains the amount of the operation applied to the acceleration pedal 21 as an acceleration pedal operation amount AP, based on the received signal. The ECU 90 controls the activations of the driving apparatus 20, based on the acceleration pedal operation amount AP.

The brake pedal operation amount sensor 72 detects an amount of an operation applied to a brake pedal 31 of the vehicle 100 and sends a signal representing the detected amount to the ECU 90. The ECU 90 obtains the amount of the operation applied to the brake pedal 31 as a brake pedal operation amount BP, based on the received signal. The ECU 90 controls the activations of the braking apparatus 30, based on the brake pedal operation amount BP.

The steering angle sensor 73 detects an angle of a steering wheel 41 of the vehicle 100 rotated by a driver of the vehicle 100 from a neutral position and sends a signal representing the detected angle to the ECU 90. The ECU 90 obtains the angle of the steering wheel 41 of the vehicle 100 rotated by the driver from the neutral position as a steering angle SA, based on the received signal. The ECU 90 controls the activations of the steering apparatus 40, based on the steering angle SA. In this embodiment, the steering angle SA takes a positive value when the steering wheel 41 is rotated counterclockwise from the neutral position. On the other hand, the steering angle SA takes a negative value when the steering wheel 41 is rotated clockwise from the neutral position.

The yaw rate sensor 74 detects a yaw rate YR of the vehicle 100 and sends a signal representing the detected yaw rate YR to the ECU 90. The ECU 90 obtains the yaw rate YR of the vehicle 100 as a vehicle yaw rate YR, based on the received signal.

The wheel speed sensor 75 includes a front left wheel speed sensor 75FL, a front right wheel speed sensor 75FR, a rear left wheel speed sensor 75RL, and a rear right wheel speed sensor 75RR.

The front left wheel speed sensor 75FL sends a pulse signal to the ECU 90 each time the front left wheel 100FL rotates by a predetermined angle. The ECU 90 obtains a rotation speed of the front left wheel 100FL as a front left wheel rotation speed Vr_FL, based on the received pulse signals.

The front right wheel speed sensor 75FR sends a pulse signal to the ECU 90 each time the front right wheel 100FR rotates by the predetermined angle. The ECU 90 obtains a rotation speed of the front right wheel 100FR as a front right wheel rotation speed Vr_FR, based on the received pulse signals.

The rear left wheel speed sensor 75RL sends a pulse signal to the ECU 90 each time the rear left wheel 100RL rotates by the predetermined angle. The ECU 90 obtains a rotation speed of the rear left wheel 100RL as a rear left wheel rotation speed Vr_RL, based on the received pulse signals.

The rear right wheel speed sensor 75RR sends a pulse signal to the ECU 90 each time the rear right wheel 100RR rotates by the predetermined angle. The ECU 90 obtains a rotation speed of the rear right wheel 100RR as a rear right wheel rotation speed Vr_RR, based on the received pulse signals.

The ECU 90 converts the obtained front left wheel rotation speed Vr_FL, the obtained front right wheel rotation speed Vr_FR, the obtained rear left wheel rotation speed Vr_RL, and the obtained rear right wheel rotation speed Vr_RR to speeds of the road wheels 100W relative to a road surface, respectively. The ECU 90 obtains the converted speeds as a front left wheel speed V_FL, a front right wheel speed V_FR, a rear left wheel speed V_RL, and a rear right wheel speed V_RR.

Hereinafter, the front left wheel speed V_FL and the front right wheel speed V_FR will be collectively referred to as "the front wheel speeds V_F." Similarly, the rear left wheel speed V_RL and the rear right wheel speed V_RR will be collectively referred to as "the rear wheel speeds V_F." Further, the front left wheel speed V_FL and the front right wheel speed V_FR, the rear left wheel speed V_RL, and the rear right wheel speed V_RR will be collectively referred to as "the wheel speeds V."

The ECU 90 obtains highest one of the obtained front left wheel rotation speed Vr_FL, the obtained front right wheel rotation speed Vr_FR, the obtained rear left wheel rotation speed Vr_RL, and the obtained rear right wheel rotation speed Vr_RR as a vehicle body moving speed V100. The vehicle body moving speed V100 is a moving speed of a body of the vehicle 100 relative to the road surface.

The ECU 90 obtains a front wheel speed difference D_F by subtracting the front right wheel speed V_FR from the front left wheel speed V_FL (D_F=V_FL-V_FR) when the front left wheel speed V_FL is higher than the front right wheel speed V_FR. On the other hand, the ECU 90 obtains the front wheel speed difference D_F by subtracting the front left wheel speed V_FL from the front right wheel speed V_FR (D_F=V_FR-V_FL) when the front right wheel speed V_FR is higher than the front left wheel speed V_FL. Moreover, the ECU 90 obtains a rear wheel speed difference D_R by subtracting the rear right wheel speed V_RR from the rear left wheel speed V_RL (D_F=V_RL-V_RR) when the rear left wheel speed V_RL is higher than the rear right wheel speed V_RR. On the other hand, the ECU 90 obtains the rear wheel speed difference D_R by subtracting the rear left wheel speed V_RL from the rear right wheel speed V_RR (D_R=V_RR-V_RL) when the rear right wheel speed V_RR is higher than the rear left wheel speed V_RL.

Summary of Operations

Next, a summary of operations of the vehicle control apparatus 10 will be described. It is desired that the vehicle turns along a moving line which the driver intends to move the vehicle when the driver performs a driving operation to turn the vehicle. In other words, it is desired to ensure a proper line traceability of the vehicle while the vehicle turns. Further, it is desired that the turning vehicle is prevented from becoming unstable due to any one of the road wheels being locked up or spinning relative to the road surface. In other words, a proper stability of the vehicle should be ensured when the vehicle turns. As described above, the proper line traceability and the proper stability of the vehicle should be ensured when the vehicle turns.

Accordingly, the vehicle control apparatus 10 is configured to execute a base braking-driving force control described below. The base braking-driving force control includes following five processes.

(1) Base requested value acquisition process.
(2) Predetermined range setting process.
(3) Yaw moment adjustment process.
(4) Wheel speed difference adjustment process.
(5) Apparatus activation process.

<Base Requested Value Acquisition Process>
<<Acquisition of Requested Braking Force>>

The vehicle control apparatus 10 executes the base requested value acquisition process as described below when the brake pedal 31 is pressed by the driver. When the brake pedal 31 is pressed by the driver, the vehicle control apparatus 10 calculates a total requested braking force Breq_total, based on the brake pedal operation amount BP. The total requested braking force Breq_total is a total of the braking forces to be applied to the road wheels 100W In addition, the vehicle control apparatus 10 distributes the total requested braking force Breq_total to a front wheel requested braking force Breq_F and a rear wheel requested braking force Breq_R by a predetermined front-rear braking force distribution ratio Rbrk.

In addition, the vehicle control apparatus 10 distributes the front wheel requested braking force Breq_F to a front left wheel requested braking force Breq_FL and a front right wheel requested braking force Breq_FR by a predetermined front-left-right-wheel braking force distribution ratio Rbrk_F. In this embodiment, the predetermined front left-right wheel braking force distribution ratio Rbrk_F is predetermined, depending on the steering angle SA and the vehicle body moving speed V100. Similarly, the vehicle control apparatus 10 distributes the rear wheel requested braking force Breq_R to a rear left wheel requested braking force Breq_RL and a rear right wheel requested braking force Breq_RR by a predetermined rear-left-right-wheel braking force distribution ratio Rbrk_R. In this embodiment, the predetermined rear left-right wheel braking force distribution ratio Rbrk_R is predetermined, depending on the steering angle SA and the vehicle body moving speed V100.

The front left wheel requested braking force Breq_FL, the front right wheel requested braking force Breq_FR, the rear left wheel requested braking force Breq_RL, and the rear right wheel requested braking force Breq_RR are base values for calculating a target front left wheel braking force Btgt_FL, a target front right wheel braking force Btgt_FR, a target rear left wheel braking force Btgt_RL, and a target rear right wheel braking force Btgt_RR, respectively. Further, the target front left wheel braking force Btgt_FL, the target front right wheel braking force Btgt_FR, the target rear left wheel braking force Btgt_RL, and the target rear right wheel braking force Btgt_RR are targets of the braking forces to be applied to the front left wheel 100FL, the front right wheel 100FR, the rear left wheel 100RL, and the rear right wheel 100RR, respectively.

<<Acquisition of Requested Driving Force>>

When the acceleration pedal 21 is pressed by the driver, the vehicle control apparatus 10 executes the base requested value acquisition process as described below. When the acceleration pedal 21 is pressed by the driver, the vehicle control apparatus 10 calculates a total requested driving force Areq_total, based on the acceleration pedal operation amount AP. The total requested driving force Areq_total is a total of the driving forces to be applied to the road wheels 100W. In addition, the vehicle control apparatus 10 distributes the total requested driving force Areq_total to a front wheel requested driving force Areq_F and a rear wheel requested driving force Areq_R by a predetermined front-rear driving force distribution ratio Racc.

In addition, the vehicle control apparatus 10 distributes the front wheel requested driving force Areq_F to a front left wheel requested driving force Areq_FL and a front right wheel requested driving force Areq_FR by a predetermined front-left-right-wheel driving force distribution ratio Racc_F. In this embodiment, the predetermined front left-right wheel driving force distribution ratio Racc_F is predetermined, depending on the steering angle SA and the vehicle body moving speed V100. Similarly, the vehicle control apparatus 10 distributes the rear wheel requested driving force Areq_R to a rear left wheel requested driving force Areq_RL and a rear right wheel requested driving force Areq_RR by a predetermined rear-left-right-wheel driving force distribution ratio Racc_R. In this embodiment, the predetermined rear left-right wheel driving force distribution ratio Racc_R is predetermined, depending on the steering angle SA and the vehicle body moving speed V100.

The front left wheel requested driving force Areq_FL, the front right wheel requested driving force Areq_FR, the rear left wheel requested driving force Areq_RL, and the rear right wheel requested driving force Areq_RR are base values for calculating a target front left wheel braking force Atgt_FL, a target front right wheel driving force Atgt_FR, a target rear left wheel driving force Atgt_RL, and a target rear right wheel driving force Atgt_RR, respectively. Further, the target front left wheel driving force Atgt_FL, the target front right wheel driving force Atgt_FR, the target rear left wheel driving force Atgt_RL, and the target rear right wheel driving force Atgt_RR are targets of the driving forces to be applied to the front left wheel 100FL, the front right wheel 100FR, the rear left wheel 100RL, and the rear right wheel 100RR, respectively.

<Predetermined Range Setting Process>

In addition, the vehicle control apparatus 10 executes the predetermined range setting process as described below. The vehicle control apparatus 10 calculates a target yaw rate YRtgt, based on the vehicle body moving speed V100 and the steering angle SA. The target yaw rate YRtgt is a target of the vehicle yaw rate YR which enables to achieve the targeted line traceability of the vehicle 100.

The vehicle control apparatus 10 calculates a base front wheel speed difference Dref_F and a base rear wheel speed difference Dref_R, based on the vehicle body moving speed V100 and the steering angle SA. In this embodiment, the base front wheel speed difference Dref_F is a difference between the front left and right wheels 100FL and 100FR theoretically generated at the current vehicle body moving speed V100 and the current steering angle SA. Similarly, in this embodiment, the base rear wheel speed difference Dref_R is a difference between the rear left and right wheels 100RL and 100RR theoretically generated at the current vehicle body moving speed V100 and the current steering angle SA.

<<Setting of Predetermined Front Wheel Speed Difference Range>>

The vehicle control apparatus 10 calculates and acquires an upper limit front wheel speed difference Dup_F by adding an acceptable increase range dDi_F to the base front wheel speed difference Dref_F in accordance with a following expression (1). In addition, the vehicle control apparatus 10 calculates and acquires a lower limit front wheel speed difference Dlow_F by subtracting an acceptable decrease range dDd_F from the base front wheel speed difference Dref_F in accordance with a following expression (2).

$$Dup\_F = Dref\_F + dDi\_F \quad (1)$$

$$Dlow\_F = Dref\_F - dDd\_F \quad (2)$$

The acceptable increase range dDi_F is a variation of the front wheel speed difference D_F accepted as far as a high tire friction force is ensured when the front wheel speed difference D_F is larger than the base front wheel speed difference Dref_F. The acceptable decrease range dDd_F is a variation of the front wheel speed difference D_F accepted as far as the high tire friction force is ensured when the front wheel speed difference D_F is smaller than the base front wheel speed difference Dref_F.

The acceptable increase range dDi_F and the acceptable decrease range dDd_F may be predetermined constant values, respectively. Alternatively, the acceptable increase range dDi_F and the acceptable decrease range dDd_F may be values calculated, based on information on current states of the vehicle 100, respectively. Further, the acceptable increase range dDi_F and the acceptable decrease range dDd_F may be equal to each other or different from each other.

In this embodiment, the vehicle control apparatus 10 calculates and acquires the acceptable increase range dDi_F and the acceptable decrease range dDd_F by (i) multiplying the vehicle body moving speed V100 by an optimum slip ratio SLref and (ii) adding a wheel speed offset value Koff to the multiplication result in accordance with following expressions (3) and (4).

$$dDi\_F = V100 * SLref + Koff \quad (3)$$

$$dDd\_F = V100 * SLref + Koff \quad (4)$$

The wheel speed offset value Koff is a correction value for correcting detection errors of the wheel speeds V used to estimate the vehicle body moving speed V100.

The optimum slip ratio SLref is a slip ratio SL which causes a friction coefficient between the road wheel 100W and the road surface to which the road wheel 100W contacts. The optimum slip ratio SLref can be obtained by experiments. In this embodiment, the slip ratio SL is defined by "Slip Rate SL=(Vehicle Body Moving Speed V100−Wheel Speed V)/(Vehicle Body Moving Speed V100)." An absolute value of the optimum slip ratio SLref is, for example, around 10 percent.

As described above, the vehicle control apparatus 10 calculates and acquires the upper limit front wheel speed difference Dup_F by adding the acceptable increase range dDi_F to the base front wheel speed difference Dref_F in accordance with a following expression (5). Also, as described above, the vehicle control apparatus 10 calculates and acquires the lower limit front wheel speed difference Dlow_F by subtracting the acceptable decrease range dDd_F from the base front wheel speed difference Dref_F in accordance with a following expression (6).

$$Dup\_F = Dref\_F + dDi\_F \quad (5)$$

$$Dlow\_F = DrefF - dDd\_F \quad (6)$$

The vehicle control apparatus 10 sets a range of the front wheel speed difference D_F defined by the lower limit front wheel speed difference Dlow_F and the upper limit front wheel speed difference Dup_F as a predetermined front wheel speed difference range Ropt_F.

<<Setting of Predetermined Rear Wheel Speed Difference Range>>

Similarly, the vehicle control apparatus 10 sets a predetermined rear wheel speed difference range Ropt_R for the rear wheels 100R. The vehicle control apparatus 10 calculates and acquires an upper limit rear wheel speed difference Dup_R by adding an acceptable increase range dDi_R to the base rear wheel speed difference Dref_R in accordance with a following expression (7). In addition, the vehicle control apparatus 10 calculates and acquires a lower limit rear wheel speed difference Dlow_R by subtracting an acceptable decrease range dDd_R from the base rear wheel speed difference Dref_R in accordance with a following expression (8).

$$Dup\_R = Dref\_R + dDi\_R \quad (7)$$

$$Dlow\_R = Dref\_R - dDd\_R \quad (8)$$

The acceptable increase range dDi_R is a variation of the rear wheel speed difference D_R accepted as far as the high tire friction force is ensured when the rear wheel speed difference D_R is larger than the base rear wheel speed difference Dref_R. The acceptable decrease range dDd_R is a variation of the rear wheel speed difference D_R accepted as far as the high tire friction force is ensured when the rear wheel speed difference D_R is smaller than the base rear wheel speed difference Dref_R.

The acceptable increase range dDi_R and the acceptable decrease range dDd_R may be predetermined constant values, respectively. Alternatively, the acceptable increase range dDi_R and the acceptable decrease range dDd_R may be values calculated, based on the information on the current states of the vehicle 100, respectively. Further, the acceptable increase range dDi_R and the acceptable decrease range dDd_R may be equal to each other or different from each other. Further, the acceptable increase range dDi_R and the acceptable decrease range dDd_R may be equal to each other or different from the acceptable increase range dDi_F and the acceptable decrease range dDd_F, respectively.

In this embodiment, the vehicle control apparatus 10 calculates and acquires the acceptable increase range dDi_R and the acceptable decrease range dDd_R by (i) multiplying the vehicle body moving speed V100 by the optimum slip ratio SLref and (ii) adding the wheel speed offset value Koff to the multiplication result in accordance with following expressions (9) and (10).

$$dDi\_R = V100 * Sref + Koff \quad (9)$$

$$dDd\_R = V100 * Sref + Koff \quad (10)$$

As described above, the vehicle control apparatus 10 calculates and acquires the upper limit rear wheel speed difference Dup_R by adding the acceptable increase range dDi_R to the base rear wheel speed difference Dref_R in accordance with a following expression (11). Also, as described above, the vehicle control apparatus 10 calculates and acquires the lower limit rear wheel speed difference Dlow_R by subtracting the acceptable decrease range dDd_R from the base rear wheel speed difference Dref_R in accordance with a following expression (12).

$$Dup\_R = Dref\_R + dDi\_R \quad (11)$$

$$Dlow\_R = Dref\_R - dDd\_R \quad (12)$$

The vehicle control apparatus 10 sets a range of the rear wheel speed difference D_R defined by the lower limit rear wheel speed difference Dlow_R and the upper limit rear wheel speed difference Dup_R as the predetermined front wheel speed difference range Ropt_R.

The vehicle control apparatus 10 determines whether the front wheel speed difference D_F is within the predetermined front wheel speed difference range Ropt_F. In addition, the vehicle control apparatus 10 determines whether the rear wheel speed difference D_R is within the predetermined rear wheel speed difference range Ropt_R.

Yaw Moment Adjustment Process to Front Wheel Braking-Driving Force

The vehicle control apparatus 10 executes the yaw moment adjustment process as described below when the vehicle control apparatus 10 determines that the front wheel speed difference D_F is within the predetermined front wheel speed difference range Ropt_F. The vehicle control apparatus 10 calculates and acquires a front left wheel yaw moment adjustment value Kadj_YM_FL, a front right wheel yaw moment adjustment value Kadj_YM_FR, a rear left wheel yaw moment adjustment value Kadj_YM_RL, and a rear right wheel yaw moment adjustment value Kadj_YM_RR which enable to control the actual vehicle yaw rate YR to the target yaw rate YRtgt.

The front left wheel yaw moment adjustment value Kadj_YM_FL, the front right wheel yaw moment adjustment value Kadj_YM_FR, the rear left wheel yaw moment adjustment value Kadj_YM_RL, and the rear right wheel yaw moment adjustment value Kadj_YM_RR may take positive or negative values, respectively, depending on whether the vehicle control apparatus 10 needs to increase or decrease the front left wheel braking force B_FL (or the front left wheel driving force A_FL), the front right wheel braking force B_FR (or the front right wheel driving force A_FR), the rear left wheel braking force B_RL (or the rear left wheel driving force A_RL), and the rear right wheel braking force B_RR (or the rear right wheel driving force A_RR) to control the actual vehicle yaw rate YR to the target yaw rate YRtgt.

When the brake pedal 31 is pressed, the vehicle control apparatus 10 calculates and acquires the target front left wheel braking force Btgt_FL by adding the front left wheel yaw moment adjustment value Kadj_YM_FL to the front left wheel requested braking force Breq_FL in accordance with a following expression (13). In addition, the vehicle control apparatus 10 calculates and acquires the target front right wheel braking force Btgt_FR by adding the front right wheel yaw moment adjustment value Kadj_YM_FR to the front right wheel requested braking force Breq_FR in accordance with a following expression (14).

$$Btgt\_FL = Breq\_FL + Kadj\_YM\_FL \tag{13}$$

$$Btgt\_FR = Breq\_FR + Kadj\_YM\_FR \tag{14}$$

On the other hand, when the acceleration pedal 21 is pressed, the vehicle control apparatus 10 calculates and acquires the target front left wheel driving force Atgt_FL by adding the front left wheel yaw moment adjustment value Kadj_YM_FL to the front left wheel requested driving force Areq_FL in accordance with a following expression (15). In addition, the vehicle control apparatus 10 calculates and acquires the target front right wheel driving force Atgt_FR by adding the front right wheel yaw moment adjustment value Kadj_YM_FR to the front right wheel requested driving force Areq_FR in accordance with a following expression (16).

$$Atgt\_FL = Areq\_FL + Kadj\_YM\_FL \tag{15}$$

$$Atgt\_FR = Areq\_FR + Kadj\_YM\_FR \tag{16}$$

Apparatus Activation Process to Front Wheel Braking-Driving Force

The vehicle control apparatus 10 controls the activations of the braking apparatus 30 and/or the driving apparatus 20 to achieve the target front wheel braking force Btgt_F when the vehicle control apparatus 10 acquires the target front wheel braking force Btgt_F larger than zero. The target front wheel braking force Btgt_F is the target front left wheel braking force Btgt_FL and the target front right wheel braking force Btgt_FR. On the other hand, when the vehicle control apparatus 10 acquires the target front wheel driving force Atgt_F larger than zero, the vehicle control apparatus 10 executes the apparatus activation process to control the activations of the driving apparatus 20 to achieve the target front wheel driving force Atgt_F. The target front wheel driving force Atgt_F is the target front left wheel driving force Atgt_FL and the target front right wheel driving force Atgt_FR.

Thereby, the vehicle yaw rate YR is controlled to or to around the target yaw rate YRtgt.

The vehicle control apparatus 10 continues executing the yaw moment control to the front wheels 100F to repeatedly execute (1) the base requested value acquisition process, (2) the predetermined range setting process, (3) the yaw moment adjustment process, and (4) the apparatus activation process as far as the front wheel speed difference D_F is within the predetermined front wheel speed difference range Ropt_F.

Yaw Moment Adjustment Process to Rear Wheel Braking-Driving Force

Similarly, the vehicle control apparatus 10 executes the yaw moment adjustment process as described below when the vehicle control apparatus 10 determines that the rear wheel speed difference D_R is within the predetermined rear wheel speed difference range Ropt_R. The vehicle control apparatus 10 calculates and acquires the front left wheel yaw moment adjustment value Kadj_YM_FL, the front right wheel yaw moment adjustment value Kadj_YM_FR, the rear left wheel yaw moment adjustment value Kadj_YM_RL, and the rear right wheel yaw moment adjustment value Kadj_YM_RR as described above.

When the brake pedal 31 is pressed, the vehicle control apparatus 10 calculates and acquires the target rear left wheel braking force Btgt_RL by adding the rear left wheel yaw moment adjustment value Kadj_YM_RL to the rear left wheel requested braking force Breq_RL in accordance with a following expression (17). In addition, the vehicle control apparatus 10 calculates and acquires the target rear right wheel braking force Btgt_RR by adding the rear right wheel yaw moment adjustment value Kadj_YM_RR to the rear right wheel requested braking force Breq_RR in accordance with a following expression (18).

$$Btgt\_RL = Breq\_RL + Kadj\_YM\_RL \tag{17}$$

$$Btgt\_RR = Breq\_RR + Kadj\_YM\_RR \tag{18}$$

On the other hand, when the acceleration pedal 21 is pressed, the vehicle control apparatus 10 calculates and acquires the target rear left wheel driving force Atgt_RL by adding the rear left wheel yaw moment adjustment value Kadj_YM_RL to the rear left wheel requested driving force Areq_RL in accordance with a following expression (19). In addition, the vehicle control apparatus 10 calculates and acquires the target rear right wheel driving force Atgt_RR by adding the rear right wheel yaw moment adjustment value Kadj_YM_RR to the rear right wheel requested driving force Areq_RR in accordance with a following expression (20).

$$Atgt\_RL = Areq\_RL + Kadj\_YM\_RL \tag{19}$$

$$Atgt\_RR = Areq\_RR + Kadj\_YM\_RR \tag{20}$$

<Apparatus Activation Process to Rear Wheel Braking-Driving Force>

The vehicle control apparatus 10 controls the activations of the braking apparatus 30 and/or the driving apparatus 20 to achieve the target rear wheel braking force Btgt_R when the vehicle control apparatus 10 acquires the target rear wheel braking force Btgt_R larger than zero. The target rear wheel braking force Btgt_R is the target rear left wheel braking force Btgt_RL and the target rear right wheel braking force Btgt_RR. On the other hand, when the vehicle control apparatus 10 acquires the target rear wheel driving force Atgt_R larger than zero, the vehicle control apparatus 10 executes the apparatus activation process to control the activations of the driving apparatus 20 to achieve the target rear wheel driving force Atgt_R. The target rear wheel driving force Atgt_R is the target rear left wheel driving force Atgt_RL and the target rear right wheel driving force Atgt_RR.

Thereby, the vehicle yaw rate YR is controlled to or to around the target yaw rate YRtgt.

The vehicle control apparatus 10 continues executing the yaw moment control to the rear wheels 100R to repeatedly execute (1) the base requested value acquisition process, (2) the predetermined range setting process, (3) the yaw moment adjustment process, and (4) the apparatus activation process as far as the rear wheel speed difference D_R is within the predetermined rear wheel speed difference range Ropt_R.

<Wheel Speed Difference Adjustment Process to Front Wheel Braking-Driving Force>

On the other hand, when the front wheel speed difference D_F is not within the predetermined front wheel speed difference range Ropt_F, the vehicle control apparatus 10 executes the wheel speed difference adjustment process as described below in place of executing the yaw moment adjustment process.

<<Case of Front Wheel Speed Difference Larger than Upper Limit Front Wheel Speed Difference>>

When the vehicle control apparatus 10 determines that the front wheel speed difference D_F is larger than the upper limit front wheel speed difference Dup_F, the vehicle control apparatus 10 calculates and acquires a difference dDup_F between the front wheel speed difference D_F and the upper limit front wheel speed difference Dup_F in accordance with a following expression (21).

$$dDup\_F = D\_F - Dup\_F \tag{21}$$

In addition, the vehicle control apparatus 10 calculates and acquires a front wheel speed difference adjustment value Kadj_D_F by (i) multiplying the difference dDup_F by a control gain Kgain and (ii) multiplying the multiplication result by one half in accordance with a following expression (22).

$$Kadj\_D\_F = (Kgain * dDup\_F) * 1/2 \tag{22}$$

The front wheel speed difference adjustment value Kadj_D_F calculated as such is an adjustment value or a correction value for controlling the front wheel speed difference D_F to the upper limit front wheel speed difference Dup_F or less.

When (i) the brake pedal 31 is pressed, and (ii) the front left wheel speed V_FL is higher than the front right wheel speed V_FR, the vehicle control apparatus 10 calculates and acquires the target front left wheel braking force Btgt_FL by adding the front wheel speed difference adjustment value Kadj_D_F to the front left wheel requested braking force Breq_FL in accordance with a following expression (23). In addition, the vehicle control apparatus 10 calculates and acquires the target front right wheel braking force Btgt_FR by subtracting the front wheel speed difference adjustment value Kadj_D_F from the front right wheel requested braking force Breq_FR in accordance with a following expression (24).

$$Btgt\_FL = Breq\_FL + Kadj\_D\_F \tag{23}$$

$$Btgt\_FR = Breq\_FR - Kadj\_D\_F \tag{24}$$

When (i) the brake pedal 31 is pressed, and (ii) the front right wheel speed V_FR is higher than the front left wheel speed V_FL, the vehicle control apparatus 10 calculates and acquires the target front right wheel braking force Btgt_FR by adding the front wheel speed difference adjustment value Kadj_D_F to the front right wheel requested braking force Breq_FR in accordance with a following expression (25). In addition, the vehicle control apparatus 10 calculates and acquires the target front left wheel braking force Btgt_FL by subtracting the front wheel speed difference adjustment value Kadj_D_F from the front left wheel requested braking force Breq_FL in accordance with a following expression (26).

$$Btgt\_FR = Breq\_FR + Kadj\_D\_F \tag{25}$$

$$Btgt\_FL = Breq\_FL - Kadj\_D\_F \tag{26}$$

When (i) the acceleration pedal 21 is pressed, and (ii) the front left wheel speed V_FL is higher than the front right wheel speed V_FR, the vehicle control apparatus 10 calculates and acquires the target front left wheel driving force Atgt_FL by subtracting the front wheel speed difference adjustment value Kadj_D_F from the front left wheel requested driving force Areq_FL in accordance with a following expression (27). In addition, the vehicle control apparatus 10 calculates and acquires the target front right wheel driving force Atgt_FR by adding the front wheel speed difference adjustment value Kadj_D_F to the front right wheel requested driving force Areq_FR in accordance with a following expression (28).

$$Atgt\_FL = Areq\_FL - Kadj\_D\_F \tag{27}$$

$$Atgt\_FR = Areq\_FR + Kadj\_D\_F \tag{28}$$

When (i) the acceleration pedal 21 is pressed, and (ii) the front right wheel speed V_FR is higher than the front left wheel speed V_FL, the vehicle control apparatus 10 calculates and acquires the target front right wheel driving force Atgt_FR by subtracting the front wheel speed difference adjustment value Kadj_D_F from the front right wheel requested driving force Areq_FR in accordance with a following expression (29). In addition, the vehicle control apparatus 10 calculates and acquires the target front left wheel driving force Atgt_FL by adding the front wheel speed difference adjustment value Kadj_D_F to the front left wheel requested driving force Areq_FL in accordance with a following expression (30).

$$Atgt\_FR = Areq\_FR - Kadj\_D\_F \tag{29}$$

$$Atgt\_FL = Areq\_FL + Kadj\_D\_F \tag{30}$$

<<Case of Front Wheel Speed Difference Smaller than Lower Limit Front Wheel Speed Difference>>

When the vehicle control apparatus 10 determines that the front wheel speed difference D_F is smaller than the lower limit front wheel speed difference Dlow_F, the vehicle control apparatus 10 calculates and acquires a difference dDlow_F between the front wheel speed difference D_F and the lower limit front wheel speed difference Dlow_F in accordance with a following expression (31).

$$dDlow\_F = D\_F - Dlow\_F \quad (31)$$

In addition, the vehicle control apparatus 10 calculates and acquires the front wheel speed difference adjustment value Kadj_D_F by (i) multiplying the difference dDlow_F by the control gain Kgain and (ii) multiplying the multiplication result by one half in accordance with a following expression (32).

$$Kadj\_D\_F = (Kgain * dDlow\_F) * 1/2 \quad (32)$$

The front wheel speed difference adjustment value Kadj_D_F calculated as such is an adjustment value or a correction value for controlling the front wheel speed difference D_F to the lower limit front wheel speed difference Dlow_F or more.

When (i) the brake pedal 31 is pressed, and (ii) the front left wheel speed V_FL is higher than the front right wheel speed V_FR, the vehicle control apparatus 10 calculates and acquires the target front left wheel braking force Btgt_FL by subtracting the front wheel speed difference adjustment value Kadj_D_F from the front left wheel requested braking force Breq_FL in accordance with a following expression (33). In addition, the vehicle control apparatus 10 calculates and acquires the target front right wheel braking force Btgt_FR by adding the front wheel speed difference adjustment value Kadj_D_F to the front right wheel requested braking force Breq_FR in accordance with a following expression (34).

$$Btgt\_FL = Breq\_FL - Kadj\_D\_F \quad (33)$$

$$Btgt\_FR = Breq\_FR + Kadj\_D\_F \quad (34)$$

When (i) the brake pedal 31 is pressed, and (ii) the front right wheel speed V_FR is higher than the front left wheel speed V_FL, the vehicle control apparatus 10 calculates and acquires the target front right wheel braking force Btgt_FR by subtracting the front wheel speed difference adjustment value Kadj_D_F from the front right wheel requested braking force Breq_FR in accordance with a following expression (35). In addition, the vehicle control apparatus 10 calculates and acquires the target front left wheel braking force Btgt_FL by adding the front wheel speed difference adjustment value Kadj_D_F to the front left wheel requested braking force Breq_FL in accordance with a following expression (36).

$$Btgt\_FR = Breq\_FR - Kadj\_D\_F \quad (35)$$

$$Btgt\_FL = Breq\_FL + Kadj\_D\_F \quad (36)$$

When (i) the acceleration pedal 21 is pressed, and (ii) the front left wheel speed V_FL is higher than the front right wheel speed V_FR, the vehicle control apparatus 10 calculates and acquires the target front left wheel driving force Atgt_FL by adding the front wheel speed difference adjustment value Kadj_D_F to the front left wheel requested driving force Areq_FL in accordance with a following expression (37). In addition, the vehicle control apparatus 10 calculates and acquires the target front right wheel driving force Atgt_FR by subtracting the front wheel speed difference adjustment value Kadj_D_F from the front right wheel requested driving force Areq_FR in accordance with a following expression (38).

$$Atgt\_FL = Areq\_FL + Kadj\_D\_F \quad (37)$$

$$Atgt\_FR = Areq\_FR - Kadj\_D\_F \quad (38)$$

When (i) the acceleration pedal 21 is pressed, and (ii) the front right wheel speed V_FR is higher than the front left wheel speed V_FL, the vehicle control apparatus 10 calculates and acquires the target front right wheel driving force Atgt_FR by adding the front wheel speed difference adjustment value Kadj_D_F to the front right wheel requested driving force Areq_FR in accordance with a following expression (39). In addition, the vehicle control apparatus 10 calculates and acquires the target front left wheel driving force Atgt_FL by subtracting the front wheel speed difference adjustment value Kadj_D_F from the front left wheel requested driving force Areq_FL in accordance with a following expression (40).

$$Atgt\_FR = Areq\_FR + Kadj\_D\_F \quad (39)$$

$$Atgt\_FL = Areq\_FL - Kadj\_D\_F \quad (40)$$

<Apparatus Activation Process to Front Wheel Braking-Driving Force>

The vehicle control apparatus 10 controls the activations of the braking apparatus 30 and/or the driving apparatus 20 to achieve the target front wheel braking force Btgt_F when the vehicle control apparatus 10 acquires the target front wheel braking force Btgt_F larger than zero. On the other hand, when the vehicle control apparatus 10 acquires the target front wheel driving force Atgt_F larger than zero, the vehicle control apparatus 10 executes the apparatus activation process to control the activations of the driving apparatus 20 to achieve the target front wheel driving force Atgt_F. Thereby, the front wheel speed difference D_F changes to the predetermined front wheel speed difference range Ropt_F.

The vehicle control apparatus 10 continues executing the wheel speed difference control to the front wheels 100F to repeatedly execute (1) the base requested value acquisition process, (2) the predetermined range setting process, (3) the wheel speed difference adjustment process, and (4) the apparatus activation process until the front wheel speed difference D_F becomes a value within the predetermined front wheel speed difference range Ropt_F.

<Wheel Speed Difference Adjustment Process to Rear Wheel Braking-Driving Force>

Similarly, when the rear wheel speed difference D_R is not within the predetermined rear wheel speed difference range Ropt_R, the vehicle control apparatus 10 executes the wheel speed difference adjustment process described below in place of executing the yaw moment adjustment process.

<<Case of Rear Wheel Speed Difference Larger than Upper Limit Rear Wheel Speed Difference>>

When the vehicle control apparatus 10 determines that the rear wheel speed difference D_R is larger than the upper limit rear wheel speed difference Dup_R, the vehicle control apparatus 10 calculates and acquires a difference dDup_R between the rear wheel speed difference D_R and the upper limit rear wheel speed difference Dup_R in accordance with a following expression (41).

$$dDup\_R = D\_R - Dup\_R \quad (41)$$

In addition, the vehicle control apparatus 10 calculates and acquires a rear wheel speed difference adjustment value Kadj_D_R by (i) multiplying the difference dDup_R by the control gain Kgain and (ii) multiplying the multiplication result by one half in accordance with a following expression (42).

$$Kadj\_D\_R = (Kgain * dDup\_R) * 1/2 \tag{42}$$

The rear wheel speed difference adjustment value Kadj_D_R calculated as such is an adjustment value or a correction value for controlling the rear wheel speed difference D_R to the upper limit rear wheel speed difference Dup_R or less.

When (i) the brake pedal 31 is pressed, and (ii) the rear left wheel speed V_RL is higher than the rear right wheel speed V_RR, the vehicle control apparatus 10 calculates and acquires the target rear left wheel braking force Btgt_RL by adding the rear wheel speed difference adjustment value Kadj_D_R to the rear left wheel requested braking force Breq_RL in accordance with a following expression (43). In addition, the vehicle control apparatus 10 calculates and acquires the target rear right wheel braking force Btgt_RR by subtracting the rear wheel speed difference adjustment value Kadj_D_R from the rear right wheel requested braking force Breq_RR in accordance with a following expression (44).

$$Btgt\_RL = Breq\_RL + Kadj\_D\_R \tag{43}$$

$$Btgt\_RR = Breq\_RR - Kadj\_D\_R \tag{44}$$

When (i) the brake pedal 31 is pressed, and (ii) the rear right wheel speed V_RR is higher than the rear left wheel speed V_RL, the vehicle control apparatus 10 calculates and acquires the target rear right wheel braking force Btgt_RR by adding the rear wheel speed difference adjustment value Kadj_D_R to the rear right wheel requested braking force Breq_RR in accordance with a following expression (45). In addition, the vehicle control apparatus 10 calculates and acquires the target rear left wheel braking force Btgt_RL by subtracting the rear wheel speed difference adjustment value Kadj_D_R from the rear left wheel requested braking force Breq_RL in accordance with a following expression (46).

$$Btgt\_RR = Breq\_RR + Kadj\_D\_R \tag{45}$$

$$Btgt\_RL = Breq\_RL - Kadj\_D\_R \tag{46}$$

When (i) the acceleration pedal 21 is pressed, and (ii) the rear left wheel speed V_RL is higher than the rear right wheel speed V_RR, the vehicle control apparatus 10 calculates and acquires the target rear left wheel driving force Atgt_RL by subtracting the rear wheel speed difference adjustment value Kadj_D_R from the rear left wheel requested driving force Areq_RL in accordance with a following expression (47). In addition, the vehicle control apparatus 10 calculates and acquires the target rear right wheel driving force Atgt_RR by adding the rear wheel speed difference adjustment value Kadj_D_R to the rear right wheel requested driving force Areq_RR in accordance with a following expression (48).

$$Atgt\_RL = Areq\_RL - Kadj\_D\_R \tag{47}$$

$$Atgt\_RR = Areq\_RR + Kadj\_D\_R \tag{48}$$

When (i) the acceleration pedal 21 is pressed, and (ii) the rear right wheel speed V_RR is higher than the rear left wheel speed V_RL, the vehicle control apparatus 10 calculates and acquires the target rear right wheel driving force Atgt_RR by subtracting the rear wheel speed difference adjustment value Kadj_D_R from the rear right wheel requested driving force Areq_RR in accordance with a following expression (49). In addition, the vehicle control apparatus 10 calculates and acquires the target rear left wheel driving force Atgt_RL by adding the rear wheel speed difference adjustment value Kadj_D_R to the rear left wheel requested driving force Areq_RL in accordance with a following expression (50).

$$Atgt\_RR = Areq\_RR - Kadj\_D\_R \tag{49}$$

$$Atgt\_RL = Areq\_RL + Kadj\_D\_R \tag{50}$$

<<Case of Rear Wheel Speed Difference Smaller than Lower Limit Rear Wheel Speed Difference>>

When the vehicle control apparatus 10 determines that the rear wheel speed difference D_R is smaller than the lower limit rear wheel speed difference Dlow_R, the vehicle control apparatus 10 calculates and acquires a difference dDlow_R between the rear wheel speed difference D_R and the lower limit rear wheel speed difference Dlow_R in accordance with a following expression (51).

$$dDlow\_R = D\_R - Dlow\_R \tag{51}$$

In addition, the vehicle control apparatus 10 calculates and acquires the rear wheel speed difference adjustment value Kadj_D_R by (i) multiplying the difference dDlow_R by the control gain Kgain and (ii) multiplying the multiplication result by one half in accordance with a following expression (52).

$$Kadj\_D\_R = (Kgain * dDlow\_R) * 1/2 \tag{52}$$

The rear wheel speed difference adjustment value Kadj_D_R calculated as such is an adjustment value or a correction value for controlling the rear wheel speed difference D_R to the lower limit rear wheel speed difference Dlow_R or more.

When (i) the brake pedal 31 is pressed, and (ii) the rear left wheel speed V_RL is higher than the rear right wheel speed V_RR, the vehicle control apparatus 10 calculates and acquires the target rear left wheel braking force Btgt_RL by subtracting the rear wheel speed difference adjustment value Kadj_D_R from the rear left wheel requested braking force Breq_RL in accordance with a following expression (53). In addition, the vehicle control apparatus 10 calculates and acquires the target rear right wheel braking force Btgt_RR by adding the rear wheel speed difference adjustment value Kadj_D_R to the rear right wheel requested braking force Breq_RR in accordance with a following expression (54).

$$Btgt\_RL = Breq\_RL - Kadj\_D\_R \tag{53}$$

$$Btgt\_RR = Breq\_RR + Kadj\_D\_R \tag{54}$$

When (i) the brake pedal 31 is pressed, and (ii) the rear right wheel speed V_RR is higher than the rear left wheel speed V_RL, the vehicle control apparatus 10 calculates and acquires the target rear right wheel braking force Btgt_RR by subtracting the rear wheel speed difference adjustment value Kadj_D_R from the rear right wheel requested braking force Breq_RR in accordance with a following expression (55). In addition, the vehicle control apparatus 10 calculates and acquires the target rear left wheel braking force Btgt_RL by adding the rear wheel speed difference adjustment value Kadj_D_R to the rear left wheel requested braking force Breq_RL in accordance with a following expression (56).

$$Btgt\_RR = Breq\_RR - Kadj\_D\_R \tag{55}$$

$$Btgt\_RL = Breq\_RL + Kadj\_D\_R \tag{56}$$

When (i) the acceleration pedal 21 is pressed, and (ii) the rear left wheel speed V_RL is higher than the rear right wheel speed V_RR, the vehicle control apparatus 10 calculates and acquires the target rear left wheel driving force Atgt_RL by adding the rear wheel speed difference adjustment value Kadj_D_R to the rear left wheel requested driving force Areq_RL in accordance with a following expression (57). In addition, the vehicle control apparatus 10 calculates and acquires the target rear right wheel driving force Atgt_RR by subtracting the rear wheel speed difference adjustment value Kadj_D_R from the rear right wheel requested driving force Areq_RR in accordance with a following expression (58).

$$Atgt\_RL = Areq\_RL + Kadj\_D\_R \tag{57}$$

$$Atgt\_RR = Areq\_RR - Kadj\_D\_R \tag{58}$$

When (i) the acceleration pedal 21 is pressed, and (ii) the rear right wheel speed V_RR is higher than the rear left wheel speed V_RL, the vehicle control apparatus 10 calculates and acquires the target rear right wheel driving force Atgt_RR by adding the rear wheel speed difference adjustment value Kadj_D_R to the rear right wheel requested driving force Areq_RR in accordance with a following expression (59). In addition, the vehicle control apparatus 10 calculates and acquires the target rear left wheel driving force Atgt_RL by subtracting the rear wheel speed difference adjustment value Kadj_D_R from the rear left wheel requested driving force Areq_RL in accordance with a following expression (60).

$$Atgt\_RR = Areq\_RR + Kadj\_D\_R \tag{59}$$

$$Atgt\_RL = Areq\_RL - Kadj\_D\_R \tag{60}$$

<Apparatus Activation Process to Rear Wheel Braking-Driving Force>

The vehicle control apparatus 10 controls the activations of the braking apparatus 30 and/or the driving apparatus 20 to achieve the target rear wheel braking force Btgt_R when the vehicle control apparatus 10 acquires the target rear wheel braking force Btgt_R larger than zero. On the other hand, when the vehicle control apparatus 10 acquires the target rear wheel driving force Atgt_R larger than zero, the vehicle control apparatus 10 executes the apparatus activation process to control the activations of the driving apparatus 20 to achieve the target rear wheel driving force Atgt_R. Thereby, the rear wheel speed difference D_R changes to the predetermined rear wheel speed difference range Ropt_R.

The vehicle control apparatus 10 continues executing the wheel speed difference control to the rear wheels 100R to repeatedly execute (1) the base requested value acquisition process, (2) the predetermined range setting process, (3) the wheel speed difference adjustment process, and (4) the apparatus activation process until the rear wheel speed difference D_R becomes a value within the predetermined rear wheel speed difference range Ropt_R.

Effects

When the slip ratio of the road wheel increases and exceeds a proper slip ratio range while the vehicle turns with being braked, the vehicle may be subject to an understeer or an oversteer. To solve the problems, there is a so-called anti-lock brake control for controlling the slip ratios of the road wheels within the proper slip ratio range by individually increasing and decreasing the braking forces applied to the road wheels.

When the braking forces applied to the road wheels are individually increased and decreased, the front wheel speed difference and/or the rear wheel speed difference may change to a significant extent. In this case, the line traceability of the vehicle may degrade. In addition, it is difficult to effectively generate the yaw moment on the vehicle to prevent the line traceability of the vehicle from degrading. Thus, the proper line traceability of the vehicle cannot be achieved when the anti-lock brake control is executed.

There may be a measure to (i) stop executing the yaw moment control to generate the yaw moment on the vehicle for ensuring the proper line traceability of the vehicle while the anti-lock brake control is executed and (ii) start to execute the yaw moment control when the anti-lock brake control terminates being executed. In this case, the anti-lock brake control and the yaw moment control are switched.

When the anti-lock brake control and the yaw moment control are switched, the vehicle may move unstably. In addition, after the yaw moment control starts to be executed, the front wheel speed difference and/or the rear wheel speed difference change to a significant extent. Thus, the proper line traceability of the vehicle may not be early achieved.

Figure 3:
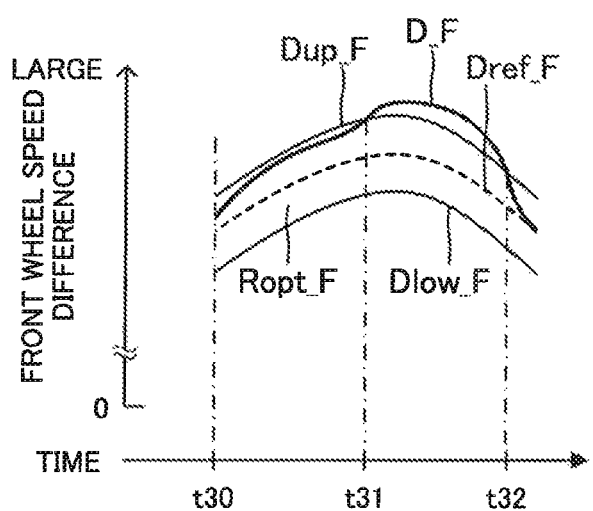
FIG. 3 is a view showing a time chart of operations of the vehicle control apparatus according to the embodiment of the present disclosure.

For example, as shown in FIG. 3, when (i) the vehicle 100 starts to turn at a time t30 and then, (ii) the front wheel speed difference D_F departs from the predetermined front wheel speed difference range Ropt_F at a time t31, the vehicle control apparatus 10 controls the front wheel speed difference D_F within the predetermined front wheel speed difference range Ropt_F by executing the wheel speed difference control. In other words, the vehicle control apparatus 10 controls the front wheel speed difference D_F to the base front wheel speed difference Dref_F. Controlling the front wheel speed difference D_F to the base front wheel speed difference Dref_F corresponds to controlling the slip ratios SL of the front wheels 100F to the proper slip ratio range. Therefore, the vehicle control apparatus 10 controls the slip ratios SL of the front wheels 100F within the proper slip ratio range by executing the wheel speed difference control.

When the front wheel speed difference D_F is controlled to the base front wheel speed difference Dref_F, the slip ratios SL of the front wheels 100F is also controlled to the proper slip ratio range. Thus, the line traceability of the vehicle 100 can be improved. This is applied to a case that the vehicle control apparatus 10 executes the wheel speed difference control to the rear wheel braking force B_R or the rear wheel driving force A_R. Therefore, the vehicle control apparatus 10 can achieve the proper line traceability of the vehicle 100 while the vehicle control apparatus 10 executes the wheel speed difference control.

In addition, the wheel speed difference control can control the front wheel speed difference D_F and the rear wheel speed difference D_R to the base front wheel speed difference Dref_F and the base rear wheel speed difference Dref_R, respectively with preventing the front wheel speed difference D_F and the rear wheel speed difference D_R from changing to a significant extent. Thereby, the front wheel speed difference D_F and the rear wheel speed difference D_R are controlled to values within the predetermined front wheel speed difference range Ropt_F and the predetermined rear wheel speed difference range Ropt_R, respectively. Thus, when the yaw moment control starts to be executed, the front wheel speed difference D_F and the rear wheel speed difference D_R are prevented from changing to a significant extent. Therefore, the vehicle yaw rate YR can be controlled to the target yaw rate YRtgt promptly after the wheel speed difference control is changed to the yaw moment control.

Further, the slip ratio proper range varies, depending on the vehicle body moving speed. The vehicle control apparatus 10 sets the predetermined front wheel speed difference range Ropt_F and the predetermined rear wheel speed difference range Ropt_R in consideration of the vehicle body moving speed V100 as a variable. Thereby, the predetermined front wheel speed difference range Ropt_F and the predetermined rear wheel speed difference range Ropt_R can be properly set in consideration of the slip ratios SL of the road wheels 100W at any values of the vehicle body moving speed V100.

The vehicle control apparatus 10 may be applied to the vehicle 100 in which only one of the front wheel braking force B_F and the rear wheel braking force B_R can be individually adjusted. Similarly, the vehicle control apparatus 10 may be applied to the vehicle 100 in which only one of the front wheel driving force A_F and the rear wheel driving force A_R can be individually adjusted.

<Specific Operations>

Figure 4:
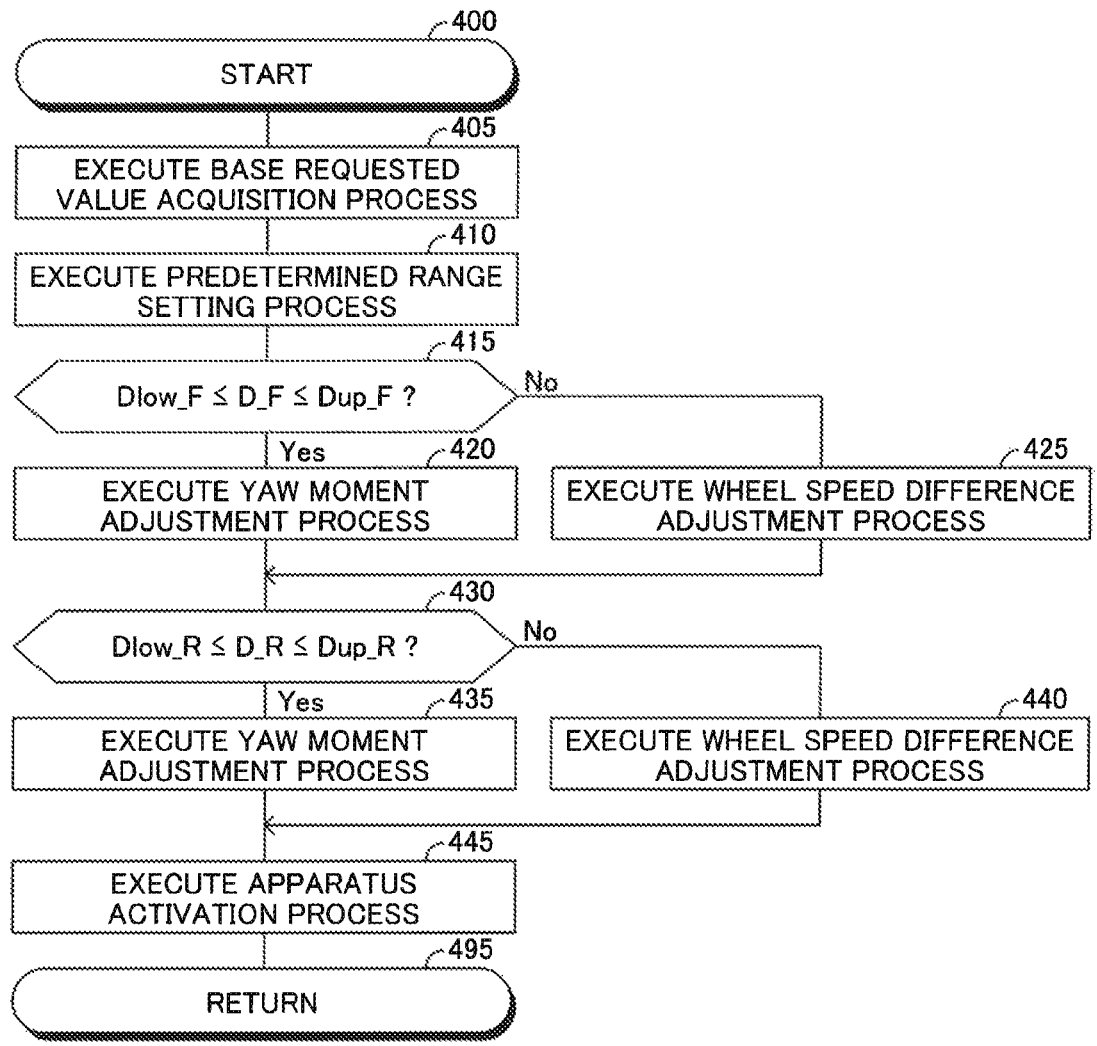
FIG. 4 is a view showing a routine executed by the vehicle control apparatus according to the embodiment of the present disclosure.

Next, specific operations of the vehicle control apparatus 10 will be described. The CPU of the ECU 90 of the vehicle control apparatus 10 is configured or programmed to execute a routine shown in FIG. 4 each time a predetermined time elapses. Therefore, at a predetermined timing, the CPU starts a process from a step 400 in FIG. 4 and proceeds with the process to a step 405 to execute the base requested value acquisition process. Next, the CPU proceeds with the process to a step 410 to execute a predetermined range setting process. Next, the CPU proceeds with the process to a step 415 to determine whether the front wheel speed difference D_F is within the predetermined front wheel speed difference range Ropt_F.

When the CPU determines "Yes" at the step 415, the CPU proceeds with the process to a step 420 to execute the yaw moment adjustment process to the front wheels 100F. Next, the CPU proceeds with the process to a step 430.

On the other hand, when the CPU determines "No" at the step 415, the CPU proceeds with the process to a step 425 to execute the wheel speed difference adjustment process. Next, the CPU proceeds with the process to the step 430.

When the CPU proceeds with the process to the step 430, the CPU determines whether the rear wheel speed difference D_R is within the predetermined rear wheel speed difference range Ropt_R.

When the CPU determines "Yes" at the step 430, the CPU proceeds with the process to a step 435 to execute the yaw moment adjustment process to the rear wheels 100R. Next, the CPU proceeds with the process to a step 445.

On the other hand, when the CPU determines "No" at the step 430, the CPU proceeds with the process to a step 440 to execute the wheel speed difference adjustment process to the rear wheels 100R. Next, the CPU proceeds with the process to the step 445.

When the CPU proceeds with the process to the step 445, the CPU executes the apparatus activation process. Next, the CPU proceeds with the process to a step 495 to terminate executing this routine once.

The specific operations of the vehicle control apparatus 10 have been described. When the vehicle control apparatus 10 executes the routine shown in FIG. 4, the braking forces or the driving forces are adjusted both to (i) control the slip ratios of the road wheels 100W within the proper slip ratio range and (ii) generate the yaw moment on the vehicle 100 to ensure the proper line traceability of the vehicle 100. Thus, the proper line traceability of the vehicle 100 can be ensured with a short braking distance of the vehicle 100 or a high acceleration performance of the vehicle 100.

It should be noted that the present disclosure is not limited to the aforementioned embodiments, and various modifications can be employed within the scope of the present disclosure.

First Modified Example

The vehicle control apparatus 10 according to a first modified example of the embodiment of the present disclosure, will be described. When the yaw moment control or the wheel speed difference control is executed, both of the slip ratios of the front left and right wheels 100F may exceed the proper slip ratio range, or both of the slip ratios of the rear left and right wheels 100R may exceed the proper slip ratio range. To solve the problems, the vehicle control apparatus 10 according to the first modified example is configured as described below.

Summary of Operations

The vehicle control apparatus 10 determines (i) whether an average front wheel speed Vave_F becomes lower than a lower limit wheel speed Vlow and (ii) whether an average rear wheel speed Vave_R becomes lower than the lower limit wheel speed Vlow when the brake pedal 31 is pressed by the driver. The lower limit wheel speed Vlow is a lower limit value of the wheel speed which (i) is higher than the wheel speed which produces the slip ratios SL of the road wheel 100W relative to the road surface corresponding to the optimum slip ratio SLref and (ii) can maintain the braking distance of the vehicle 100 within an acceptable range.

<Braking Force Increasing-Decreasing Control to Front Wheel Braking Force>

The vehicle control apparatus 10 executes a braking force decrease control of a braking force increase-decrease control to the front wheel braking force B_F when the vehicle control apparatus 10 determines that the average front wheel speed Vave_F becomes lower than the lower limit wheel speed Vlow. The braking force decrease control includes following five processes.

(1) Requested value decrease process.
(2) Predetermined range setting process.
(3) Yaw moment adjustment process.
(4) Wheel speed difference adjustment process.
(5) Apparatus activation process.

<Requested Value Decreasing Process to Front Wheel Braking Force>

When the vehicle control apparatus 10 starts to execute the braking force decrease control to the front wheel braking force B_F, the vehicle control apparatus 10 executes the requested value decrease process as described below. When the vehicle control apparatus 10 has not acquired a corrected front wheel requested braking force Breq_ccn_F described later, the vehicle control apparatus 10 calculates and acquires the total requested braking force Breq_total, based on the brake pedal operation amount BP. In addition, the vehicle control apparatus 10 distributes the total requested braking force Breq_total with the predetermined front-rear braking force distribution ratio Rbrk to the front wheel requested braking force Breq_F and the rear wheel requested braking force Breq_R. The vehicle control apparatus 10 acquires the front wheel requested braking force Breq_F and the rear wheel requested braking force Breq_R as a front wheel base requested braking force Breq_base_F and a rear wheel base requested braking force Breq_base_R, respectively. In addition, the vehicle control apparatus 10 calculates and acquires the corrected front wheel requested braking force Breq_ccn_F by subtracting a predetermined value d10 from the base front wheel requested braking force Breq_base_F.

On the other hand, when the vehicle control apparatus 10 has acquired the corrected front wheel requested braking force Breq_ccn_F, the vehicle control apparatus 10 acquires the new front wheel corrected request braking force Breq_ccn_F by subtracting the predetermined value d10 from the latest front wheel corrected request braking force Breq_ccn_F (i.e., the previously-acquired front wheel corrected request braking force Breq_ccn_F).

Then, the vehicle control apparatus 10 calculates and acquires a corrected front left wheel requested braking force Breq_ccn_FL and a corrected front right wheel requested braking force Breq_ccn_FR by distributing the corrected front wheel requested braking force Breq_ccn_F with a predetermined front left-right wheel braking force distribution ratio Rbrk_F.

<Predetermined Range Setting Process to Front Wheel Speed Difference>

In addition, the vehicle control apparatus 10 sets the predetermined front wheel speed difference range Ropt_F by executing the predetermined range setting process described above.

<Yaw Moment Adjustment Process and Wheel Speed Difference Adjustment Process to Front Wheel Braking Force>

In addition, the vehicle control apparatus 10 executes the yaw moment adjustment process and the wheel speed difference adjustment process described above, based on the corrected front left wheel requested braking force Breq_ccn_FL and the corrected front right wheel requested braking force Breq_ccn_FR acquired by the requested value decrease process. Thereby, the vehicle control apparatus 10 acquires a target front left wheel corrected braking force Btgt_ccn_FL and a target front right wheel corrected braking force Btgt_ccn_FR.

<Apparatus Activation Process to Front Wheel Braking Force>

Then, the vehicle control apparatus 10 executes the apparatus activation process to control the activations of the braking apparatus 30 and/or the driving apparatus 20 to achieve the corrected target front left wheel braking force Btgt_ccn_FL and the corrected target front right wheel braking force Btgt_ccn_FR. Thereby the average front wheel speed Vave_F increases.

The vehicle control apparatus 10 repeatedly executes the braking force decrease control until the average front wheel speed Vave_F reaches a regained wheel speed Vg. Thereby, the average front wheel speed Vave_F gradually increases. The regained wheel speed Vg is set to a value higher than the lower limit wheel speed Vlow and lower than the vehicle body moving speed V100.

<Braking Force Increasing Control to Front Wheel Braking Force>

When the average front wheel speed Vave_F reaches the regained wheel speed Vg, the vehicle control apparatus 10 executes a braking force increase control of the braking force increase-decrease control to the front wheel braking force B_F. The braking force increase control includes following five processes.

(1) Requested value increase process.
(2) Predetermined range setting process.
(3) Yaw moment adjustment process.
(4) Wheel speed difference adjustment process.
(5) Apparatus activation process.

<Requested Value Increasing Process to Front Wheel Braking Force>

When the vehicle control apparatus 10 starts to execute the braking force increase control to the front wheel braking force B_F, the vehicle control apparatus 10 executes the requested value increase process as described below. The vehicle control apparatus 10 acquires the new front wheel corrected request braking force Breq_ccn_F by adding a predetermined value d11 to the latest front wheel corrected request braking force Breq_ccn_F (i.e., the previously-acquired front wheel corrected request braking force Breq_ccn_F). The predetermined value d11 may be equal to or different from the predetermined value d10.

Then, the vehicle control apparatus 10 calculates and acquires the corrected front left wheel requested braking force Breq_ccn_FL and the corrected front right wheel requested braking force Breq_ccn_FR by distributing the corrected front wheel requested braking force Breq_ccn_F with the predetermined front left-right wheel braking force distribution ratio Rbrk_F.

<Predetermined Range Setting Process to Front Wheel Speed Difference>

In addition, the vehicle control apparatus 10 sets the predetermined front wheel speed difference range Ropt_F by executing the predetermined range setting process described above.

<Yaw Moment Adjustment Process and Wheel Speed Difference Adjustment Process to Front Wheel Braking Force>

In addition, the vehicle control apparatus 10 executes the yaw moment adjustment process and the wheel speed difference adjustment process described above, based on the corrected front left wheel requested braking force Breq_ccn_FL and the corrected front right wheel requested braking force Breq_ccn_FR acquired by the requested value increase process. Thereby, the vehicle control apparatus 10 acquires the target front left wheel corrected braking force Btgt_ccn_FL and the target front right wheel corrected braking force Btgt_ccn_FR.

<Apparatus Activation Process to Front Wheel Braking Force>

Then, the vehicle control apparatus 10 executes the apparatus activation process to control the activations of the braking apparatus 30 and/or the driving apparatus 20 to achieve the corrected target front left wheel braking force Btgt_ccn_FL and the corrected target front right wheel braking force Btgt_ccn_FR. Thereby, the average front wheel speed Vave_F decreases.

When the corrected front wheel requested braking force Breq_ccn_F acquired by the requested value increase process is equal to or larger than the base front wheel requested braking force Breq_base_F, the vehicle control apparatus 10 terminates executing the braking force increase-decrease control and starts to execute the base braking-driving force control.

On the other hand, when the corrected front wheel requested braking force Breq_ccn_F acquired by the requested value increase process is smaller than the base front wheel requested braking force Breq_base_F, the vehicle control apparatus 10 repeatedly executes the braking force increase control until (i) the average front wheel speed Vave_F becomes lower than the lower limit wheel speed Vlow, or (ii) the corrected front wheel requested braking force Breq_ccn_F becomes equal to or larger than the base front wheel requested braking force Breq_base_F. Thereby, the average front wheel speed Vave_F gradually decreases.

The vehicle control apparatus 10 repeatedly executes the braking force decrease control until the corrected front wheel requested braking force Breq_ccn_F becomes equal to or larger than the base front wheel requested braking force Breq_base_F as far as the average front wheel speed Vave_F is lower than the lower limit wheel speed Vlow. When the average front wheel speed Vave_F has reached the regained wheel speed Vg, the vehicle control apparatus 10 repeatedly executes the braking force increase control.

It should be noted that the vehicle control apparatus 10 according to the first modified example executes the base braking-driving force control described above when (i) the brake pedal 31 is pressed by the driver, and (ii) the average front wheel speed Vave_F is higher than or equal to the lower limit wheel speed Vlow.

<Braking Force Increasing-Decreasing Control to Rear Wheel Braking Force>

Similarly, the vehicle control apparatus 10 executes the braking force decrease control of the braking force increase-decrease control to the rear wheel braking force B_R when the vehicle control apparatus 10 determines that the average rear wheel speed Vave_R becomes lower than the lower limit wheel speed Vlow.

<Requested Value Decreasing Process to Rear Wheel Braking Force>

When the vehicle control apparatus 10 starts to execute the braking force decrease control to the rear wheel braking force B_R, the vehicle control apparatus 10 executes the requested value decrease process as described below. When the vehicle control apparatus 10 has not acquired a corrected rear wheel requested braking force Breq_ccn_R described later, the vehicle control apparatus 10 calculates and acquires the total requested braking force Breq_total, based on the brake pedal operation amount BP. In addition, the vehicle control apparatus 10 distributes the total requested braking force Breq_total with the predetermined front-rear braking force distribution ratio Rbrk to the front wheel requested braking force Breq_F and the rear wheel requested braking force Breq_R. The vehicle control apparatus 10 acquires the front wheel requested braking force Breq_F and the rear wheel requested braking force Breq_R as the front wheel base requested braking force Breq_base_F and the rear wheel base requested braking force Breq_base_R, respectively. In addition, the vehicle control apparatus 10 calculates and acquires the corrected rear wheel requested braking force Breq_ccn_R by subtracting a predetermined value d12 from the base rear wheel requested braking force Breq_base_R. The predetermined value d12 may be equal to or different from the predetermined value D10.

On the other hand, when the vehicle control apparatus 10 has acquired the corrected rear wheel requested braking force Breq_ccn_R, the vehicle control apparatus 10 acquires the new rear wheel corrected request braking force Breq_ccn_R by subtracting the predetermined value d12 from the latest rear wheel corrected request braking force Breq_ccn_R (i.e., the previously-acquired rear wheel corrected request braking force Breq_ccn_R).

Then, the vehicle control apparatus 10 calculates and acquires a corrected rear left wheel requested braking force Breq_ccn_RL and a corrected rear right wheel requested braking force Breq_ccn_RR by distributing the corrected rear wheel requested braking force Breq_ccn_R with a predetermined rear left-right wheel braking force distribution ratio Rbrk_R.

<Predetermined Range Setting Process to Rear Wheel Speed Difference>

In addition, the vehicle control apparatus 10 sets the predetermined rear wheel speed difference range Ropt_R by executing the predetermined range setting process described above.

<Yaw Moment Adjustment Process and Wheel Speed Difference Adjustment Process to Rear Wheel Braking Force>

In addition, the vehicle control apparatus 10 executes the yaw moment adjustment process and the wheel speed difference adjustment process described above, based on the corrected rear left wheel requested braking force Breq_ccn_RL and the corrected rear right wheel requested braking force Breq_ccn_RR acquired by the requested value decrease process. Thereby, the vehicle control apparatus 10 acquires a target rear left wheel corrected braking force Btgt_ccn_RL and a target rear right wheel corrected braking force Btgt_ccn_RR.

<Apparatus Activation Process to Rear Wheel Braking Force>

Then, the vehicle control apparatus 10 executes the apparatus activation process to control the activations of the braking apparatus 30 and/or the driving apparatus 20 to achieve the corrected target rear left braking force Btgt_ccn_RL and the corrected target rear right wheel braking force Btgt_ccn_RR. Thereby, the average rear wheel speed Vave_R increases.

The vehicle control apparatus 10 repeatedly executes the braking force decrease control until the average rear wheel speed Vave_R reaches the regained wheel speed Vg. Thereby, the average rear wheel speed Vave_R gradually increases.

<Braking Force Increasing Control to Rear Wheel Braking Force>

When the average rear wheel speed Vave_R reaches the regained wheel speed Vg, the vehicle control apparatus 10 executes the braking force increase control to the rear wheel braking force B_R.

<Requested Value Increasing Process to Rear Wheel Braking Force>

When the vehicle control apparatus 10 starts to execute the braking force increase control to the rear wheel braking force B_R, the vehicle control apparatus 10 executes the requested value increase process as described below. The vehicle control apparatus 10 acquires the new rear wheel corrected request braking force Breq_ccn_R by adding a predetermined value d13 to the latest rear wheel corrected request braking force Breq_ccn_R (i.e., the previously-acquired rear wheel corrected request braking force Breq_ccn_R). The predetermined value d13 may be equal to or different from the predetermined value d12. Further, the predetermined value d13 may be equal to or different from the predetermined value d11.

Then, the vehicle control apparatus 10 calculates and acquires the corrected rear left wheel requested braking force Breq_ccn_RL and the corrected rear right wheel requested braking force Breq_ccn_RR by distributing the corrected rear wheel requested braking force Breq_ccn_R with the predetermined rear left-right wheel braking force distribution ratio Rbrk_R.

<Predetermined Range Setting Process to Rear Wheel Speed Difference>

In addition, the vehicle control apparatus 10 sets the predetermined rear wheel speed difference range Ropt_R by executing the predetermined range setting process described above.

<Yaw Moment Adjustment Process and Wheel Speed Difference Adjustment Process to Rear Wheel Braking Force>

In addition, the vehicle control apparatus 10 executes the yaw moment adjustment process and the wheel speed difference adjustment process described above, based on the corrected rear left wheel requested braking force Breq_ccn_RL and the corrected rear right wheel requested braking force Breq_ccn_RR acquired by the requested value increase process. Thereby, the vehicle control apparatus 10 acquires the target rear left wheel corrected braking force Btgt_ccn_RL and the target rear right wheel corrected braking force Btgt_ccn_RR.

<Apparatus Activation Process to Rear Wheel Braking Force>

Then, the vehicle control apparatus 10 executes the apparatus activation process to control the activations of the braking apparatus 30 and/or the driving apparatus 20 to achieve the corrected target rear left braking force Btgt_ccn_RL and the corrected target rear right wheel braking force Btgt_ccn_RR. Thereby, the average rear wheel speed Vave_R decreases.

When the corrected rear wheel requested braking force Breq_ccn_R acquired by the requested value increase process is equal to or larger than the base rear wheel requested braking force Breq_base_R, the vehicle control apparatus 10 terminates executing the braking force increase-decrease control and starts to execute the base braking-driving force control.

On the other hand, when the corrected rear wheel requested braking force Breq_ccn_R acquired by the requested value increase process is smaller than the base rear wheel requested braking force Breq_base_R, the vehicle control apparatus 10 repeatedly executes the braking force increase control until (i) the average rear wheel speed Vave_R becomes lower than the lower limit wheel speed Vlow, or (ii) the corrected rear wheel requested braking force Breq_ccn_R becomes equal to or larger than the base rear wheel requested braking force Breq_base_R. Thereby, the average rear wheel speed Vave_R gradually decreases.

The vehicle control apparatus 10 repeatedly executes the braking force decrease control until the corrected rear wheel requested braking force Breq_ccn_R becomes equal to or larger than the base rear wheel requested braking force Breq_base_R as far as the average rear wheel speed Vave_R is lower than the lower limit wheel speed Vlow. When the average rear wheel speed Vave_R has reached the regained wheel speed Vg, the vehicle control apparatus 10 repeatedly executes the braking force increase control.

It should be noted that the vehicle control apparatus 10 according to the first modified example executes the base braking-driving force control described above when (i) the brake pedal 31 is pressed by the driver, and (ii) the average rear wheel speed Vave_R is higher than or equal to the lower limit wheel speed Vlow.

Effects

The vehicle control apparatus 10 can control the slip ratios of the road wheels within the proper slip ratio range by executing the braking force increase-decrease control. Thus, a proper braking performance of the vehicle 100 can be achieved. In addition, the vehicle control apparatus 10 executes the yaw moment adjustment process or the wheel speed difference adjustment process while the vehicle control apparatus 10 executes the braking force increase-decrease control. Thus, the proper braking performance and the proper line traceability of the vehicle 100 can be achieved while the braking force increase-decrease control is executed.

<Specific Operations>

Figure 5:
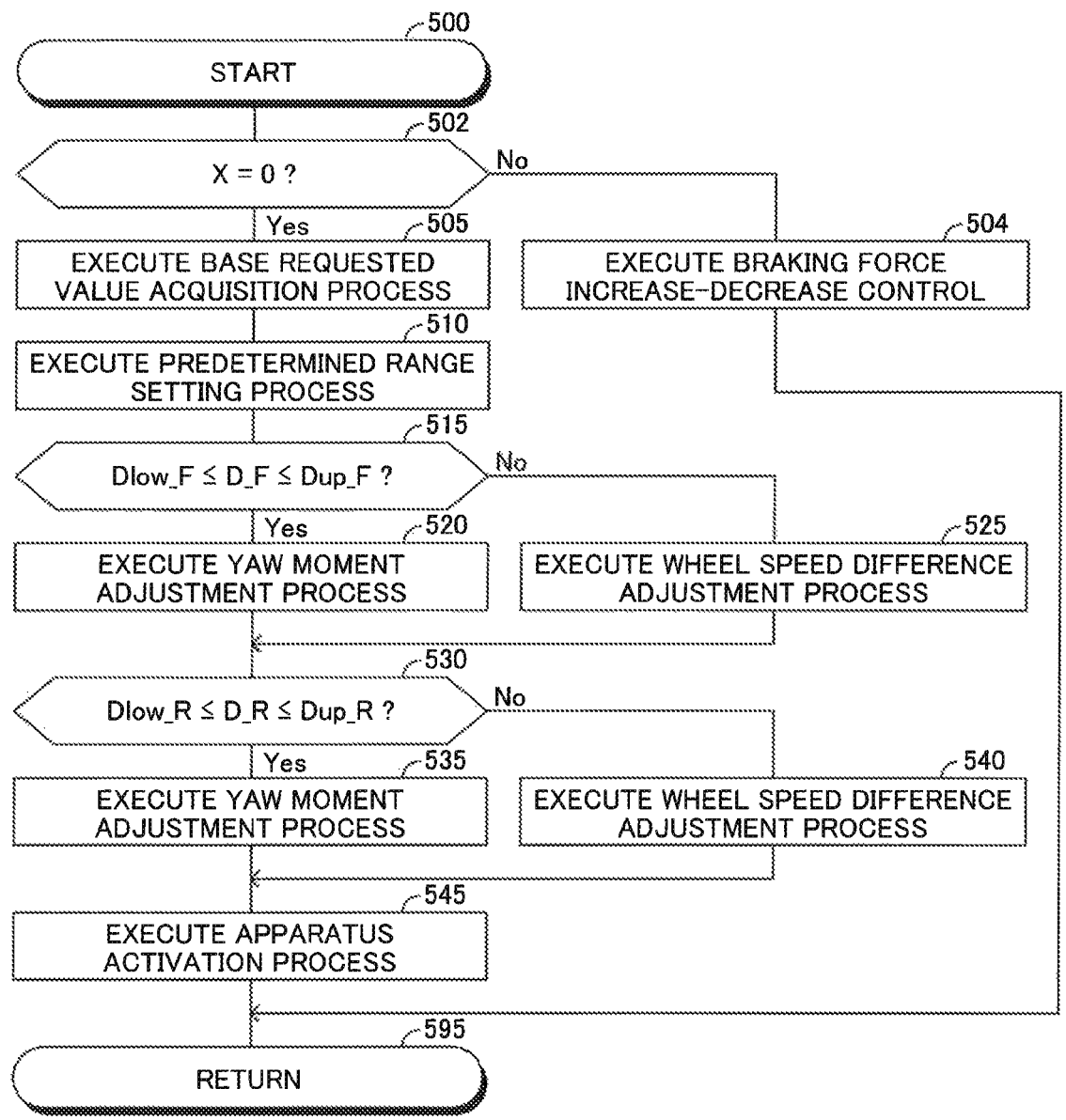
FIG. 5 is a view showing a routine executed by the vehicle control apparatus according to a first modified example of the embodiment of the present disclosure.

Next, specific operations of the vehicle control apparatus 10 according to the first modified example, will be described. The CPU of the ECU 90 of the vehicle control apparatus 10 according to the first modified example is configured or programmed to execute a routine shown in FIG. 5 each time the predetermined time elapses. Therefore, at a predetermined timing, the CPU start a process from a step 500 in FIG. 5 and proceeds with the process to a step 502 to determine whether a value of a braking force increase-decrease control flag X is "0" The value of the braking force increase-decrease control flag X is set to "1" when the braking force increase-decrease control needs to be executed. On the other hand, the value of the braking force increase-decrease control flag X is set to "0" when the braking force increase-decrease control does not need to be executed.

When the CPU determines "Yes" at the step 502, the CPU executes processes of steps 505 to 545. The processes of the steps 505 to 545 are the same as processes of the steps 405 to 445 of the routine shown in FIG. 4.

On the other hand, when the CPU determines "No" at the step 502, the CPU proceeds with the process to a step 504 to execute the braking force increase-decrease control. Next, the CPU proceeds with the process to a step 595 to terminate executing this routine once.

The specific operations of the vehicle control apparatus 10 according to the first modified example have been described. When the vehicle control apparatus 10 according to the first modified example executes the routine shown in FIG. 5, the yaw moment adjustment process or the wheel speed difference adjustment process is executed while the braking force increase-decrease control is executed. Thus, the proper braking performance and the proper line traceability of the vehicle 100 can be achieved.

Second Modified Example

Next, the vehicle control apparatus 10 according to a second modified example of the embodiment of the present disclosure, will be described. The slip ratio of the road wheel increases as the braking force applied to the road wheel increases. Therefore, if the yaw moment control is executed without considering the slip ratios of the road wheels, the yaw moment control may continue being executed with the braking forces causing the slip ratios of the road wheels to exceed the acceptable upper limit values being applied to the road wheels. When the slip ratios of the road wheels exceed the acceptable upper limit values, the proper braking performance and the proper line traceability of the vehicle may not be achieved.

Summary of Operations

Accordingly, the vehicle control apparatus 10 according to the second modified example executes the predetermined range setting process as described below in place of executing the predetermined range setting process described above.

<Predetermined Range Setting Process to Front Wheel Speed Difference>

The vehicle control apparatus 10 calculates and acquires an average of the front left wheel speed V_FL and the front right wheel speed V_FR as an average front wheel speed Vave_F (=(V_FL+V_FR)/2). In addition, the vehicle control apparatus 10 calculates and acquires an average slip ratio of the front wheels 100F as an average front wheel slip ratio SLave_F, based on the vehicle body moving speed V100 and the average front wheel speed Vave_F. In this embodiment, the vehicle control apparatus 10 calculates and acquires the average front wheel speed SLave_F by (i) subtracting the average front wheel speed Vave_F from the vehicle body moving speed V100 and (ii) dividing the subtraction result by the vehicle body moving speed V100 in accordance with a following expression (61).

$$SLave\_F=(V100-Vave\_F)/V100 \qquad (61)$$

In addition, the vehicle control apparatus 10 calculates and acquires a front wheel slip ratio difference dSL_F by subtracting the average front wheel speed SLave_F from the optimum slip ratio SLref in accordance with a following expression (62).

$$dSL\_F=SLref-SLave\_F \qquad (62)$$

In addition, the vehicle control apparatus 10 calculates and acquires an acceptable increase range dDi_F and an acceptable decrease range dDd_F by (i) multiplying the vehicle body moving speed V100 by the front wheel slip ratio difference dSL_F and (ii) adding the wheel speed offset value Koff to the multiplication result in accordance with following expressions (63) and (64).

$$dDi\_F=V100*dSL\_F+Koff \qquad (63)$$

$$dDd\_F=V100*dSL\_F+Koff \qquad (64)$$

The vehicle control apparatus 10 calculates and acquires the upper limit front wheel speed difference Dup_F by adding the acceptable increase range dDi_F to the base front wheel speed difference Dref_F in accordance with a following expression (65). In addition, the vehicle control apparatus 10 calculates and acquires the lower limit front wheel speed difference Dlow_F by subtracting the acceptable decrease range dDd_F from the base front wheel speed difference Dref_F in accordance with a following expression (66).

$$Dup\_F=Dref\_F+dDi\_F \qquad (65)$$

$$Dlow\_F=DrefF-dDd\_F \qquad (66)$$

<Predetermined Range Setting Process to Rear Wheel Speed Difference>

The vehicle control apparatus 10 calculates and acquires an average of the rear left wheel speed V_RL and the rear right wheel speed V_RR as an average rear wheel speed Vave_R (=(V_RL+V_RR)/2). In addition, the vehicle control apparatus 10 calculates and acquires an average slip ratio of the rear wheels 100R as an average rear wheel slip ratio SLave_R, based on the vehicle body moving speed V100 and the average rear wheel speed Vave_R. In this embodiment, the vehicle control apparatus 10 calculates and acquires the average rear wheel speed SLave_R by (i) subtracting the average rear wheel speed Vave_R from the vehicle body moving speed V100 and (ii) dividing the subtraction result by the vehicle body moving speed V100 in accordance with a following expression (67).

$$SLave\_R=(V100-Vave\_R)/V100 \qquad (67)$$

In addition, the vehicle control apparatus 10 calculates and acquires a rear wheel slip ratio difference dSL_R by subtracting the average rear wheel speed SLave_R from the optimum slip ratio SLref in accordance with a following expression (68).

$$dSL\_R=SLref-SLave\_R \qquad (68)$$

In addition, the vehicle control apparatus 10 calculates and acquires an acceptable increase range dDi_R and an acceptable decrease range dDd_R by (i) multiplying the vehicle body moving speed V100 by the rear wheel slip ratio difference dSL_R and (ii) adding the wheel speed offset value Koff to the multiplication result in accordance with following expressions (69) and (70).

$$dDi\_R=V100*dSL\_R+Koff \qquad (69)$$

$$dDd\_R=V100*dSL\_R+Koff \qquad (70)$$

The vehicle control apparatus 10 calculates and acquires the upper limit front wheel speed difference Dup_R by adding the acceptable increase range dDi_R to the base rear wheel speed difference Dref_R in accordance with a following expression (71). In addition, the vehicle control apparatus 10 calculates and acquires the lower limit rear wheel speed difference Dlow_R by subtracting the acceptable decrease range dDd_R from the base rear wheel speed difference Dref_R in accordance with a following expression (72).

$$Dup\_R=Dref\_R+dDi\_R \qquad (71)$$

$$Dlow\_R=Dref\_R-dDd\_R \qquad (72)$$

The vehicle control apparatus 10 executes the base braking-driving force control by using the upper limit front wheel speed difference Dup_F, the lower limit front wheel speed difference Dlow_F, the upper limit rear wheel speed difference Dup_R, and the lower limit rear wheel speed difference Dlow_R acquired as described above.

Effects

The vehicle control apparatus 10 according to the second modified example sets the predetermined front wheel speed difference range Ropt_F and the predetermined rear wheel speed difference range Ropt_R in consideration of the slip ratios SL of the road wheels 100W. Therefore, the yaw moment control cannot be executed with the braking or driving forces causing the slip ratios SL of the road wheels 100W to exceed the acceptable upper limit being applied to the road wheels 100W. Thus, the proper braking performance, the proper acceleration performance, and the proper line traceability of the vehicle 100 can be ensured.

When the line traceability of the vehicle 100 is needed rather than the braking performance of the vehicle 100, the braking forces applied to the road wheels 100W may be limited to constant forces. Thereby, the predetermined front wheel speed difference range Ropt_F and the predetermined rear wheel speed difference range Ropt_R are enlarged. Thus, the yaw moment control is more likely to be executed. As a result, the proper line traceability of the vehicle 100 can be ensured.

Third Modified Example

Next, the vehicle control apparatus 10 according to a third modified example of the embodiment of the present disclosure, will be described. The yaw moment control and the wheel speed difference control are switched at the upper limit front wheel speed difference Dup_F and the lower limit front wheel speed difference Dlow_F by the base braking-driving force control. As described above, the braking and/or driving forces are applied to the road wheels 100W to generate the yaw moment on the vehicle 100 while the wheel speed difference control is executed. Thus, a movement of the vehicle 100 is kept stable when the yaw moment control and the wheel speed difference control are switched. However, the braking and/or driving forces applied to the road wheels 100W may rapidly change when the yaw moment control and the wheel speed difference control are switched. If the braking and/or driving forces rapidly change, the movement of the vehicle 100 becomes unstable.

Summary of Operations

To solve the problems described above, the vehicle control apparatus 10 according to the third modified example is configured to execute an adjustment process described below in place of executing the yaw moment control and the wheel speed difference adjustment process described above.

<Adjustment Process>

The vehicle control apparatus 10 acquires the front left wheel yaw moment adjustment value Kadj_YM_FL, the front right wheel yaw moment adjustment value Kadj_YM_FR, the rear left wheel yaw moment adjustment value Kadj_YM_RL, and the rear right wheel yaw moment adjustment value Kadj_YM_RR as described above. In addition, the vehicle control apparatus 10 acquires the front wheel speed difference adjustment value Kadj_D_F and the rear wheel speed difference adjustment value Kadj_D_R as described above.

It should be noted that the vehicle control apparatus 10 sets the front wheel speed difference adjustment value Kadj_D_F to zero when the front wheel speed difference D_F is within a range from the lower limit front wheel speed difference Dlow_F to the upper limit front wheel speed difference Dup_F. Similarly, the vehicle control apparatus 10 sets the rear wheel speed difference adjustment value Kadj_D_R to zero when the rear wheel speed difference D_R is within a range from the lower limit rear wheel speed difference Dlow_R to the upper limit rear wheel speed difference Dup_R.

<<Acquisition of Target Front Left Wheel Braking-Driving Force>>

The vehicle control apparatus 10 acquires a front left wheel adjustment value Kadj_FL, based on the front left wheel yaw moment adjustment value Kadj_YM_FL, the front wheel speed difference adjustment value Kadj_D_F, and a weight coefficient Kw_F in accordance with a following expression (73).

$$Kadj\_FL = (1-Kw\_F)*Kadj\_YM\_FL + Kw\_F*Kadj\_D\_F \quad (73)$$

Figure 6A:
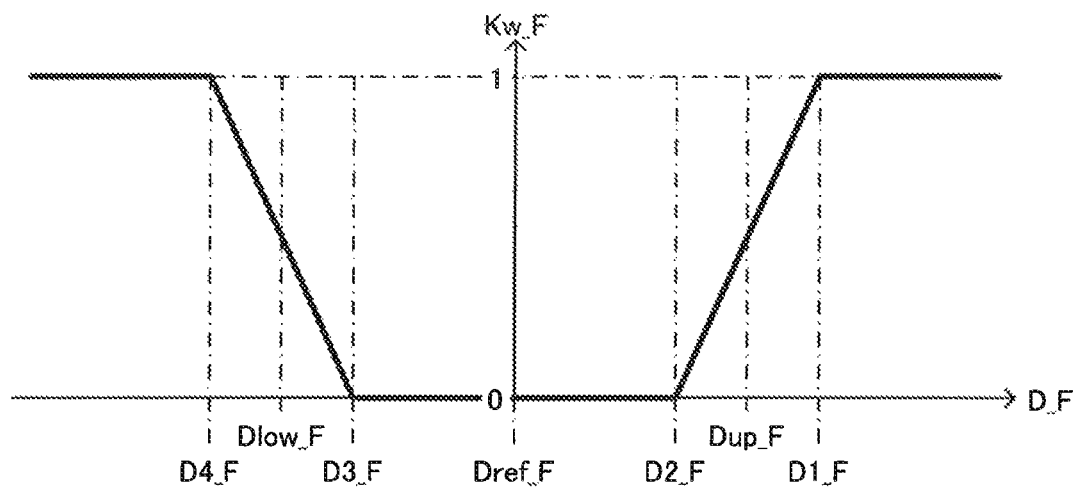
FIG. 6A is a view showing a relationship between a front wheel speed difference and a weight coefficient.

In this embodiment, as shown in FIG. 6A, the weight coefficient Kw_F varies, depending on the front wheel speed difference D_F. In an example shown in FIG. 6A, a threshold D1_F, a threshold D2_F, a threshold D3_F, and a threshold D4_F to be compared with the front wheel speed difference D_F, are set.

The threshold D1_F is larger than the upper limit front wheel speed difference Dup_F. In addition, a difference between the threshold D1_F and the upper limit front wheel speed difference Dup_F is equal to or smaller than a predetermined value. The threshold D2_F is larger than zero and smaller than the upper limit front wheel speed difference Dup_F. In addition, a difference between the threshold D2_F and the upper limit front wheel speed difference Dup_F is equal to or smaller than the predetermined value.

The threshold D4_F is smaller than the lower limit front wheel speed difference Dlow_F. In addition, a difference between the threshold D4_F and the lower limit front wheel speed difference Dlow_F is equal to or smaller than the predetermined value. The threshold D3_F is smaller than zero and larger than the lower limit front wheel speed difference Dlow_F. In addition, a difference between the threshold D3_F and the lower limit front wheel speed difference Dlow_F is equal to or smaller than the predetermined value.

When the front wheel speed difference D_F is larger than the threshold D1_F, the weight coefficient Kw_F is "1." As the front wheel speed difference D_F decreases from the threshold D1_F to the threshold D2_F, the weight coefficient Kw_F gradually decreases from "1" to "0." When the front wheel speed difference D_F is between the threshold D2_F and the threshold D3_F, the weight coefficient Kw_F is "0." As the front wheel speed difference D_F decreases from the threshold D3_F to the threshold D4_F, the weight coefficient Kw_F gradually increases from "0" to "1." When the front wheel speed difference D_F is smaller than the threshold D4_F, the weight coefficient Kw_F is "1."

When the brake pedal 31 is pressed, the vehicle control apparatus 10 calculates and acquires the target front left wheel braking force Btgt_FL by adding the front left wheel adjustment value Kadj_FL to the front left wheel requested braking force Breq_FL in accordance with a following expression (74). On the other hand, when the acceleration pedal 21 is pressed, the vehicle control apparatus 10 calculates and acquires the target front left wheel driving force Atgt_FL by adding the front left wheel adjustment value Kadj_FL to the front left wheel requested driving force Areq_FL in accordance with a following expression (75).

$$Btgt\_FL = Breq\_FL + Kadj\_FL \quad (74)$$

$$Atgt\_FL = Areq\_FL + Kadj\_FL \quad (75)$$

<<Acquisition of Target Front Right Wheel Braking-Driving Force>>

The vehicle control apparatus 10 acquires a front right wheel adjustment value Kadj_FR, based on the front right wheel yaw moment adjustment value Kadj_YM_FR, the front wheel speed difference adjustment value Kadj_D_F, and the weight coefficient Kw_F in accordance with a following expression (76).

$$Kadj\_FR = (1-Kw\_F)*Kadj\_YM\_FR + Kw\_F*Kadj\_D\_F \quad (76)$$

When the brake pedal 31 is pressed, the vehicle control apparatus 10 calculates and acquires the target front right wheel braking force Btgt_FR by adding the front right wheel adjustment value Kadj_FR to the front right wheel requested braking force Breq_FR in accordance with a following expression (77). On the other hand, when the acceleration pedal 21 is pressed, the vehicle control apparatus 10 calculates and acquires the target front right wheel driving force Atgt_FR by adding the front right wheel adjustment value Kadj_FR to the front right wheel requested driving force Areq_FR in accordance with a following expression (78).

$$Btgt\_FR = Breq\_FR + Kadj\_FR \quad (77)$$

$$Atgt\_FR = Areq\_FR + Kadj\_FR \quad (78)$$

<<Acquisition of Target Rear Left Wheel Braking-Driving Force>>

Similarly, the vehicle control apparatus 10 acquires a rear left wheel adjustment value Kadj_RL, based on the rear left wheel yaw moment adjustment value Kadj_YM_RL, the rear wheel speed difference adjustment value Kadj_D_R, and a weight coefficient Kw_R in accordance with a following expression (79).

$$Kadj\_RL = (1-Kw\_R)*Kadj\_YM\_RL + Kw\_R*Kadj\_D\_R \quad (79)$$

Figure 6B:
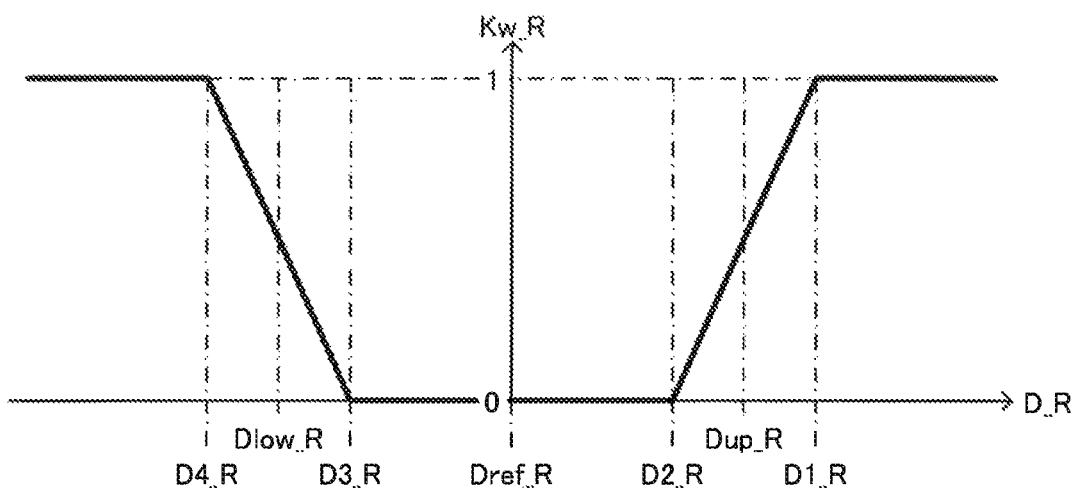
FIG. 6B is a view showing a relationship between a rear wheel speed difference and a weight coefficient.

In this embodiment, as shown in FIG. 6B, the weight coefficient Kw_R varies, depending on the rear wheel speed difference D_R. In an example shown in FIG. 6B, a threshold D1_R, a threshold D2_R, a threshold D3_R, and a threshold D4_R to be compared with the rear wheel speed difference D_R, are set.

The threshold D1_R is larger than the upper limit rear wheel speed difference Dup_R. In addition, a difference between the threshold D1_R and the upper limit rear wheel speed difference Dup_R is equal to or smaller than the predetermined value. The threshold D2_R is larger than zero and smaller than the upper limit rear wheel speed difference Dup_R. In addition, a difference between the threshold D2_R and the upper limit rear wheel speed difference Dup_R is equal to or smaller than the predetermined value.

The threshold D4_F is smaller than the lower limit rear wheel speed difference Dlow_R. In addition, a difference between the threshold D4_R and the lower limit rear wheel speed difference Dlow_R is equal to or smaller than the predetermined value. The threshold D3_R is smaller than zero and larger than the lower limit rear wheel speed difference Dlow_R. In addition, a difference between the threshold D3_R and the lower limit rear wheel speed difference Dlow_R is equal to or smaller than the predetermined value.

When the rear wheel speed difference D_R is larger than the threshold D1_R, the weight coefficient Kw_R is "1." As the rear wheel speed difference D_R decreases from the threshold D1_R to the threshold D2_R, the weight coefficient Kw_R gradually decreases from "1" to "0." When the rear wheel speed difference D_R is between the threshold D2_R and the threshold D3_R, the weight coefficient Kw_R is "0." As the rear wheel speed difference D_R decreases from the threshold D3_R to the threshold D4_R, the weight coefficient Kw_R gradually increases from "0" to "1." When the rear wheel speed difference D_R is smaller than the threshold D4_R, the weight coefficient Kw_R is "1."

When the brake pedal 31 is pressed, the vehicle control apparatus 10 calculates and acquires the target rear left wheel braking force Btgt_RL by adding the rear left wheel adjustment value Kadj_RL to the rear left wheel requested braking force Breq_RL in accordance with a following expression (80). On the other hand, when the acceleration pedal 21 is pressed, the vehicle control apparatus 10 calculates and acquires the target rear left wheel driving force Atgt_RL by adding the rear left wheel adjustment value Kadj_RL to the rear left wheel requested driving force Areq_RL in accordance with a following expression (81).

$$Btgt\_RL = Breq\_RL + Kadj\_RL \quad (80)$$

$$Atgt\_RL = Areq\_RL + Kadj\_RL \quad (81)$$

<<Acquisition of Target Rear Right Wheel Braking-Driving Force>>

The vehicle control apparatus 10 acquires a rear right wheel adjustment value Kadj_RR, based on the rear right wheel yaw moment adjustment value Kadj_YM_RR, the rear wheel speed difference adjustment value Kadj_D_R, and the weight coefficient Kw_R in accordance with a following expression (82).

$$Kadj\_RR = (1-Kw\_R)*Kadj\_YM\_RR + Kw\_R*Kadj\_D\_R \quad (82)$$

When the brake pedal 31 is pressed, the vehicle control apparatus 10 calculates and acquires the target rear right wheel braking force Btgt_RR by adding the rear right wheel adjustment value Kadj_RR to the rear right wheel requested braking force Breq_RR in accordance with a following expression (83). On the other hand, when the acceleration pedal 21 is pressed, the vehicle control apparatus 10 calculates and acquires the target rear right wheel driving force Atgt_RR by adding the rear right wheel adjustment value Kadj_RR to the rear right wheel requested driving force Areq_RR in accordance with a following expression (84).

$$Btgt\_RR = Breq\_RR + Kadj\_RR \quad (83)$$

$$Atgt\_RR = Areq\_RR + Kadj\_RR \quad (84)$$

Effects

According to the vehicle control apparatus 10 according to the third modified example, the front left wheel adjustment value Kadj_FL and the front right wheel adjustment value Kadj_FR continuously change as the front wheel speed difference D_F increases or decreases across the upper limit front wheel speed difference Dup_F. Similarly, the rear left wheel adjustment value Kadj_RL and the rear right wheel adjustment value Kadj_RR continuously change as the rear wheel speed difference D_R increases or decreases across the upper limit rear wheel speed difference Dup_R. Therefore, the braking and/or driving forces applied to the road wheel 100W can be prevented from rapidly changing when the yaw moment control and the wheel speed difference control are switched. As a result, the proper stability of the vehicle can be ensured when the yaw moment control and the wheel speed difference control are switched.

<Specific Operations>

Figure 7:
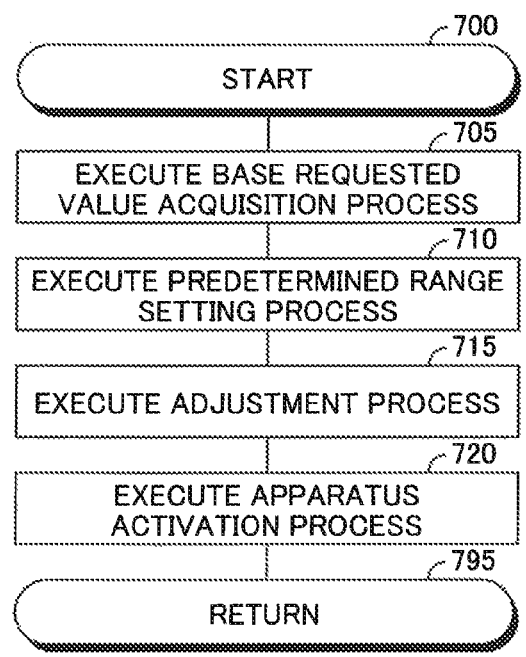
FIG. 7 is a view showing a routine executed by the vehicle control apparatus according to a third modified example of the embodiment of the present disclosure.

Next, specific operations of the vehicle control apparatus 10 according to the third modified example, will be described. The CPU of the ECU 90 of the vehicle control apparatus 10 according to the third modified example is configured or programmed to execute a routine shown in FIG. 7 each time the predetermined time elapses. Therefore, at a predetermined timing, the CPU starts a process from a step 700 in FIG. 7 and proceeds with the process to a step 705 to execute the base requested value acquisition process. Next, the CPU proceeds with the process to a step 710 to execute the predetermined range setting process. Next, the CPU proceeds with the process to a step 715 to execute the adjustment process. Next, the CPU proceeds with the process to a step 720 to execute the apparatus activation process. Next, the CPU proceeds with the process to a step 795 to terminate executing this routine once.

The specific operations of the vehicle control apparatus 10 according to the third modified example, have been described. When the vehicle control apparatus 10 according to the third modified example executes the routine shown in FIG. 7, the braking and/or driving forces applied to the road wheels 100W can be prevented from rapidly changing when the yaw moment control and the wheel speed difference control are switched. As a result, the proper stability of the vehicle can be ensured when the yaw moment control and the wheel speed difference control are switched.

What is claimed is:

1. A vehicle control apparatus applied to a vehicle including a front left wheel, a front right wheel, a rear left wheel, and a rear right wheel, the vehicle control apparatus comprising an electronic control unit configured to:

execute a yaw moment control to control a yaw rate of the vehicle to a target yaw rate by (i) adjusting a braking force or a driving force applied to the front left wheel by a front left wheel yaw moment adjustment value, (ii) adjusting a braking force or a driving force applied to the front right wheel by a front right wheel yaw moment adjustment value, (iii) adjusting a braking force or a driving force applied to the rear left wheel by a rear left wheel yaw moment adjustment value, and (iv) adjusting a braking force or a driving force applied to the rear right wheel by a rear right wheel yaw moment adjustment value; and execute a speed difference control to (i) control a front wheel speed difference between a speed of the front left wheel and a speed of the front right wheel to be within a predetermined front wheel speed difference range by adjusting the braking force or the driving force applied to the front left wheel by a front wheel speed difference adjustment value and adjusting the braking force or the driving force applied to the front right wheel by the front wheel speed difference adjustment value and (ii) control a rear wheel speed difference between a speed of the rear left wheel and a speed of the rear right wheel to be within a predetermined rear wheel speed difference range by adjusting the braking force or the driving force applied to the rear left wheel by a rear wheel speed difference adjustment value and adjusting the braking force or the driving force applied to the rear right wheel by the rear wheel speed difference adjustment value, wherein the electronic control unit is configured to:

execute the yaw moment control of the front left and right wheels when the front wheel speed difference is within the predetermined front wheel speed difference range;

execute the speed difference control of the front left and right wheels when the front wheel speed difference is not within the predetermined front wheel speed difference range;

execute the yaw moment control of the rear left and right wheels when the rear wheel speed difference is within the predetermined rear wheel speed difference range; and execute the speed difference control of the rear left and right wheels when the rear wheel speed difference is not within the predetermined rear wheel speed difference range.

2. The vehicle control apparatus as set forth in claim 1, wherein:

when (i) the electronic control unit executes the yaw moment control of the front left and right wheels, (ii) the front wheel speed difference is larger than a lower limit of the predetermined front wheel speed difference range, and (iii) a difference between the front wheel speed difference and an upper limit of the predetermined front wheel speed difference range is smaller than or equal to a value within a predetermined front wheel upper range, the electronic control unit is configured to:

acquire (i) a first front wheel upper adjustment ratio which decreases as the front wheel speed difference increases and (ii) a second front wheel upper adjustment ratio which increases as the front wheel speed difference increases; and (i) adjust the braking force or the driving force applied to the front left wheel by the first front wheel upper adjustment ratio as the front left wheel yaw moment adjustment value and the second front wheel upper adjustment ratio as the front wheel speed difference adjustment value and (ii) adjust the braking force or the driving force applied to the front right wheel by the first front wheel upper adjustment ratio as the front right wheel yaw moment adjustment value and the second front wheel upper adjustment ratio as the front wheel speed difference adjustment value; and when (i) the electronic control unit executes the yaw moment control of the rear left and right wheels, (ii) the rear wheel speed difference is larger than a lower limit of the predetermined rear wheel speed difference range, and (iii) a difference between the rear wheel speed difference and an upper limit of the predetermined rear wheel speed difference range is smaller than or equal to a value within a predetermined rear wheel upper range, the electronic control unit is configured to:

acquire (i) a first rear wheel upper adjustment ratio which decreases as the rear wheel speed difference increases and (ii) a second rear wheel upper adjustment ratio which increases as the rear wheel speed difference increases; and (i) adjust the braking force or the driving force applied to the rear left wheel by the first rear wheel upper adjustment ratio as the rear left wheel yaw moment adjustment value and the second rear wheel upper adjustment ratio as the rear wheel speed difference adjustment value and (ii) adjust the braking force or the driving force applied to the rear right wheel by the first rear wheel upper adjustment ratio as the rear right wheel yaw moment adjustment value and the second rear wheel upper adjustment ratio as the rear wheel speed difference adjustment value.

3. The vehicle control apparatus as set forth in claim 1, wherein:

when (i) the electronic control unit executes the yaw moment control of the front left and right wheels, (ii) the front wheel speed difference is smaller than an upper limit of the predetermined front wheel speed difference range, and (iii) a difference between the front wheel speed difference and a lower limit of the predetermined front wheel speed difference range is smaller than or equal to a value within a predetermined front wheel lower range, the electronic control unit is configured to:

acquire (i) a first front wheel lower adjustment ratio which decreases as the front wheel speed difference decreases and (ii) a second front wheel lower adjustment ratio which increases as the front wheel speed difference decreases; and (i) adjust the braking force or the driving force applied to the front left wheel by the first front wheel lower adjustment ratio as the front left wheel yaw moment adjustment value and the second front wheel lower adjustment ratio as the front wheel speed difference adjustment value and (ii) adjust the braking force or the driving force applied to the front right wheel by the first front wheel lower adjustment ratio as the front right wheel yaw moment adjustment value and the second front wheel lower adjustment ratio as the front wheel speed difference adjustment value; and when (i) the electronic control unit executes the yaw moment control of the rear left and right wheels, (ii) the rear wheel speed difference is smaller than an upper limit of the predetermined rear wheel speed difference range, and (iii) a difference between the rear wheel speed difference and a lower limit of the predetermined rear wheel speed difference range is smaller than or equal to a value within a predetermined rear wheel lower range, the electronic control unit is configured to:
acquire (i) a first rear wheel lower adjustment ratio which decreases as the rear wheel speed difference decreases and (ii) a second rear wheel lower adjustment ratio which increases as the rear wheel speed difference decreases; and
(i) adjust the braking force or the driving force applied to the rear left wheel by the first rear wheel lower adjustment ratio as the rear left wheel yaw moment adjustment value and the second rear wheel lower adjustment ratio as the rear wheel speed difference adjustment value and (ii) adjust the braking force or the driving force applied to the rear right wheel by the first rear wheel lower adjustment ratio as the rear right wheel yaw moment adjustment value and the second rear wheel lower adjustment ratio as the rear wheel speed difference adjustment value.

4. The vehicle control apparatus as set forth in claim 1, wherein:
the predetermined front wheel speed difference range and the predetermined rear wheel speed difference range set when a moving speed of a body of the vehicle is high, are larger than the predetermined front wheel speed difference range and the predetermined rear wheel speed difference range set when the moving speed of the body of the vehicle is low, respectively.

5. The vehicle control apparatus as set forth in claim 1, wherein:
the predetermined front wheel speed difference range set when a front wheel slip ratio average value of slip ratios of the front left and right wheels is large, is smaller than the predetermined front wheel speed difference range set when the front wheel slip ratio average value is small; and
the predetermined rear wheel speed difference range set when a rear wheel slip ratio average value of slip ratios of the rear left and right wheels is large, is smaller than the predetermined rear wheel speed difference range set when the rear wheel slip ratio average value is small.

6. The vehicle control apparatus as set forth in claim 1, wherein:
when (i) the electronic control unit executes the yaw moment control, (ii) the electronic control unit applies the braking forces to the front left and right wheels, and (iii) a front wheel slip ratio average value of slip ratios of the front left and right wheels is larger than a predetermined slip ratio, the electronic control unit is configured to increase or decrease the braking forces applied to the front left and right wheels by adjusting the braking forces applied to the front left and right wheels by the yaw moment adjustment value; and
when (i) the electronic control unit executes the yaw moment control, (ii) the electronic control unit applies the braking forces to the rear left and right wheels, and (iii) a rear wheel slip ratio average value of slip ratios of the rear left and right wheels is larger than the predetermined slip ratio, the electronic control unit is configured to increase or decrease the braking forces applied to the rear left and right wheels by adjusting the braking forces applied to the rear left and right wheels by the yaw moment adjustment value.

7. The vehicle control apparatus as set forth in claim 1, wherein:
when (i) the electronic control unit executes the speed difference control, (ii) the electronic control unit applies the braking forces to the front left and right wheels, and (iii) a front wheel slip ratio average value of slip ratios of the front left and right wheels is larger than a predetermined slip ratio, the electronic control unit is configured to increase or decrease the braking forces applied to the front left and right wheels by adjusting the braking forces applied to the front left and right wheels by the front wheel speed difference adjustment value; and
when (i) the electronic control unit executes the speed difference control, (ii) the electronic control unit applies the braking forces to the rear left and right wheels, and (iii) a rear wheel slip ratio average value of slip ratios of the rear left and right wheels is larger than the predetermined slip ratio, the electronic control unit is configured to increase or decrease the braking forces applied to the rear left and right wheels by adjusting the braking forces applied to the rear left and right wheels by the rear wheel speed difference adjustment value.

* * * * *